US011423658B2

(12) United States Patent
Oami et al.

(10) Patent No.: US 11,423,658 B2
(45) Date of Patent: Aug. 23, 2022

(54) GUIDANCE PROCESSING APPARATUS AND GUIDANCE METHOD

(71) Applicant: NEC Corporation, Tokyo (JP)

(72) Inventors: Ryoma Oami, Tokyo (JP); Hiroyoshi Miyano, Tokyo (JP); Yusuke Takahashi, Tokyo (JP); Hiroo Ikeda, Tokyo (JP); Yukie Ebiyama, Tokyo (JP); Ryo Kawai, Tokyo (JP); Takuya Ogawa, Tokyo (JP); Kazuya Koyama, Tokyo (JP); Hiroshi Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/297,414

(22) Filed: Mar. 8, 2019

(65) Prior Publication Data

US 2019/0272430 A1 Sep. 5, 2019

Related U.S. Application Data

(63) Continuation of application No. 15/323,307, filed as application No. PCT/JP2015/065405 on May 28, 2015, now Pat. No. 11,138,443.

(30) Foreign Application Priority Data

Jun. 30, 2014 (JP) .................................. 2014-134664

(51) Int. Cl.
*G06V 20/52* (2022.01)
*G08G 1/005* (2006.01)
(Continued)

(52) U.S. Cl.
CPC .............. *G06V 20/53* (2022.01); *G06F 3/147* (2013.01); *G06M 11/00* (2013.01); *G08G 1/005* (2013.01);
(Continued)

(58) Field of Classification Search
None
See application file for complete search history.

(56) References Cited

U.S. PATENT DOCUMENTS 6,745,123 B1 6/2004 Petzold et al.
8,401,789 B2 3/2013 Natsume
(Continued)

FOREIGN PATENT DOCUMENTS

CN 101445122 A 6/2009
CN 101795395 A 8/2010
(Continued)

OTHER PUBLICATIONS

Abstract Translation and Machine Translation of JP 2003259337 A (Year: 2003).*
(Continued)

*Primary Examiner* — Michelle M Entezari

(57) ABSTRACT

A guidance processing apparatus (100) includes an information acquisition unit (101) that acquires a plurality of different pieces of guidance information on the basis of states of a plurality of people within one or more images, and a control unit (102) that performs control of a plurality of target devices present in different spaces or time division control of a target device so as to set a plurality of different states corresponding to the plurality of pieces of guidance information.

16 Claims, 19 Drawing Sheets

(51) Int. Cl.
  *G08G 1/04* (2006.01)
  *G06M 11/00* (2006.01)
  *H04N 7/18* (2006.01)
  *G06F 3/147* (2006.01)

(52) U.S. Cl.
  CPC .............. *G08G 1/04* (2013.01); *H04N 7/181* (2013.01); *H04N 7/188* (2013.01); *G09G 2380/06* (2013.01)

(56) References Cited

U.S. PATENT DOCUMENTS

| | | | |
|---|---|---|---|
| 8,428,918 | B2 | 4/2013 | Atrazhev et al. |
| 8,457,879 | B2 | 6/2013 | Merkel |
| 8,738,292 | B1* | 5/2014 | Faaborg ................ G01C 21/00 701/537 |
| 8,812,344 | B1* | 8/2014 | Saurabh ............ G06Q 30/0201 705/7.29 |
| 8,868,340 | B1 | 10/2014 | Rinckes et al. |
| 8,942,859 | B2 | 1/2015 | Rauch |
| 9,109,896 | B2* | 8/2015 | Banaszuk ............... G01C 21/00 |
| 9,601,009 | B2* | 3/2017 | Scofield ............... G08G 1/0129 |
| 10,228,895 | B2 | 3/2019 | Miyajima |
| 10,433,399 | B2* | 10/2019 | Den Hartog ........... H05B 47/12 |
| 10,679,495 | B2* | 6/2020 | Cross ................... G08G 1/056 |
| 2002/0168084 | A1* | 11/2002 | Trajkovic ........... G06K 9/00778 382/100 |
| 2006/0143036 | A1 | 6/2006 | Kato |
| 2007/0109134 | A1 | 5/2007 | Dugan et al. |
| 2009/0115617 | A1* | 5/2009 | Sano ..................... H04L 67/306 340/286.01 |
| 2009/0119142 | A1 | 5/2009 | Yenni et al. |
| 2011/0007944 | A1* | 1/2011 | Atrazhev ........... G06K 9/00778 382/103 |
| 2011/0115920 | A1* | 5/2011 | Wang ................ H04N 5/23254 348/169 |
| 2011/0130636 | A1 | 6/2011 | Daniel et al. |
| 2011/0183644 | A1 | 7/2011 | Gupta |
| 2011/0184768 | A1 | 7/2011 | Tibberts |
| 2011/0184769 | A1 | 7/2011 | Tibberts |
| 2011/0199231 | A1 | 8/2011 | Loiselle et al. |
| 2011/0267179 | A1 | 11/2011 | Patterson |
| 2011/0314084 | A1* | 12/2011 | Saretto ................... H04W 4/21 709/203 |
| 2012/0116789 | A1 | 5/2012 | Boss |
| 2012/0245881 | A1 | 9/2012 | Takaoka |
| 2013/0041941 | A1 | 2/2013 | Tomasic et al. |
| 2013/0210461 | A1* | 8/2013 | Moldavsky ........ G06Q 30/0267 455/456.3 |
| 2013/0328698 | A1 | 12/2013 | Ramachandran |
| 2013/0332509 | A1 | 12/2013 | Schwartz |
| 2014/0045517 | A1* | 2/2014 | Marti .................... H04W 4/029 455/456.1 |
| 2014/0062837 | A1 | 3/2014 | Inagawa |
| 2014/0072170 | A1 | 3/2014 | Zhang et al. |
| 2014/0085107 | A1 | 3/2014 | Gutierrez |
| 2014/0163860 | A1 | 6/2014 | Chiantera |
| 2014/0343980 | A1 | 11/2014 | Majid et al. |
| 2014/0379477 | A1 | 12/2014 | Sheinfeld et al. |
| 2015/0009332 | A1 | 1/2015 | Fuhrmann |
| 2015/0066558 | A1 | 3/2015 | Kamiagar et al. |
| 2015/0120340 | A1 | 4/2015 | Cheatham, III et al. |
| 2015/0177006 | A1 | 6/2015 | Schulz et al. |
| 2015/0362909 | A1 | 12/2015 | McReynolds et al. |
| 2016/0027266 | A1 | 1/2016 | McDonagh et al. |
| 2016/0063144 | A1* | 3/2016 | Cooke ..................... G06F 30/20 703/2 |
| 2016/0103690 | A1 | 4/2016 | Kim et al. |
| 2016/0334235 | A1* | 11/2016 | Gustafson ........... G01C 21/3492 |
| 2017/0046575 | A1* | 2/2017 | Zhao ..................... G06V 20/46 |
| 2017/0190544 | A1* | 7/2017 | Witczak ................ B66B 1/2466 |
| 2018/0341814 | A1* | 11/2018 | Li ..................... G08B 13/19663 |
| 2019/0019404 | A1* | 1/2019 | Ikeda ..................... G06Q 50/30 |
| 2019/0051155 | A1* | 2/2019 | Yamaguchi .......... G08G 1/0965 |
| 2020/0092004 | A1 | 3/2020 | Murakami |
| 2020/0116506 | A1* | 4/2020 | Kruglick ............... H04W 4/024 |
| 2021/0117646 | A1* | 4/2021 | Miwa ..................... G06V 20/17 |
| 2022/0017115 | A1* | 1/2022 | Biala .................... G08G 1/0116 |
| 2022/0058944 | A1* | 2/2022 | Jha .......................... G06T 11/00 |

FOREIGN PATENT DOCUMENTS

| | | | | |
|---|---|---|---|---|
| CN | 102724390 | A | 10/2012 | |
| CN | 102616614 | B | 1/2016 | |
| JP | 4-75199 | | 3/1992 | |
| JP | 6-240901 | | 8/1994 | |
| JP | 8-202849 | | 8/1996 | |
| JP | 9-138241 | | 5/1997 | |
| JP | 2003259337 | A * | 9/2003 | |
| JP | 2004-86762 | | 3/2004 | |
| JP | 2005-106769 | A | 4/2005 | |
| JP | 2006-171204 | A | 7/2006 | |
| JP | 2007-34585 | | 2/2007 | |
| JP | 2007-290574 | A | 11/2007 | |
| JP | 2008-132568 | | 6/2008 | |
| JP | 2010-287251 | | 12/2010 | |
| JP | 2013073371 | A * | 4/2013 | |
| JP | 2014-49086 | | 3/2014 | |
| WO | WO-2008043877 | A1 * | 4/2008 | ........... B66B 1/2408 |

OTHER PUBLICATIONS

JP 2013-73371 A [machine translation] (Year: 2013).*
Liang, Zilu, and Yasushi Wakahara. "Real-time urban traffic amount prediction models for dynamic route guidance systems." EURASIP Journal on Wireless Communications and Networking Jan. 2014. (2014): 1-13. (Year: 2014).*
Pulugurtha SS, Jain RN. Influencing Travel Patterns Through Real-time Dissemination of Parking Facility Occupancy. In2018 21st International Conference on Intelligent Transportation Systems (ITSC) Nov. 4, 2018 (pp. 1864-1869). IEEE. (Year: 2018).*
Pan J, Khan MA, Popa IS, Zeitouni K, Borcea C. Proactive vehicle re-routing strategies for congestion avoidance. In2012 IEEE 8th International Conference on Distributed Computing in Sensor Systems May 16, 2012 (pp. 265-272). IEEE. (Year: 2012).*
International Search Report and Written Opinion dated Aug. 18, 2015, in corresponding PCT International Application.
Office Action dated Jan. 24, 2019, from the Chinese Patent Office in corresponding Chinese Patent Application No. CN 2015800362575.
Office Action dated Jun. 25, 2019, by the United States Patent and Trademark Office in counterpart U.S. Appl. No. 15/323,307.
U.S. Office Action dated Dec. 13, 2019, issued in co-pending U.S. Appl. No. 15/323,307.
Office Action, dated Feb. 5, 2020, issued by the United States Patent Office in counterpart U.S. Appl. No. 16/297,450.
Office Action, dated Feb. 10, 2020, issued by the United States Patent Office in counterpart U.S. Appl. No. 16/297,436.
Office Action dated May 20, 2020, issued by the U.S. Patent and Trademark Office in co-pending U.S. Appl. No. 16/297,436.
Office Action dated May 19, 2020, issued by the U.S. Patent and Trademark Office in co-pending U.S. Appl. No. 16/297,450.
Office Action dated Jul. 2, 2020, issued by the U.S. Patent and Trademark Office in co-pending U.S. Appl. No. 15/323,307.
Notice of Allowance dated Aug. 26, 2020, issued by the U.S. Patent and Trademark Office in co-pending U.S. Appl. No. 16/297,450.
Japanese Office Action far JP Application No. 2020-088740 dated Jun. 22, 2021 with English Translation.
U.S. Office Action for U.S. Appl. No. 15/323,307 dated Dec. 28, 2020.

* cited by examiner

FIG. 4

| MONITORED PLACE | STATE OF CROWD |
|---|---|
| PASSAGE A | DEGREE OF CROWDEDNESS (1) |
| PASSAGE B | DEGREE OF CROWDEDNESS (5) |
| PASSAGE C | DEGREE OF CROWDEDNESS (6) |
| ROOM A | DEGREE OF CROWDEDNESS (10) |
| PASSAGE D | DEGREE OF CROWDEDNESS (7) |
| ⋮ | ⋮ |

FIG. 9
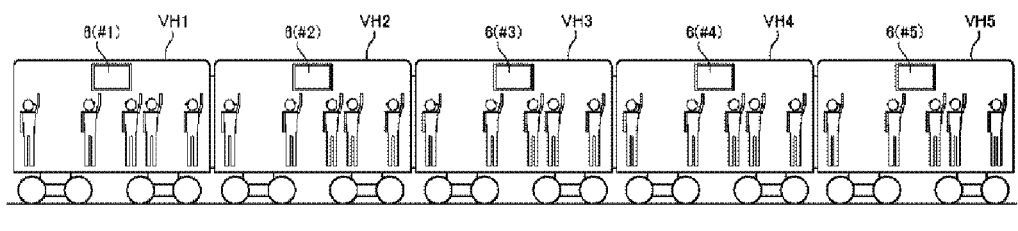
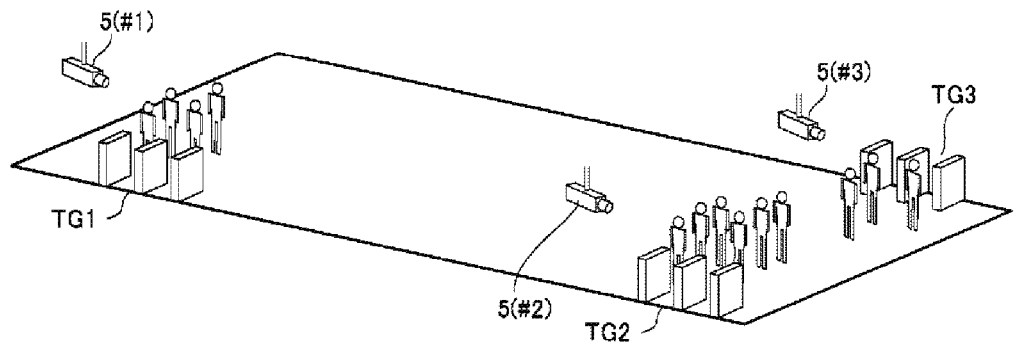

GUIDANCE PROCESSING APPARATUS AND GUIDANCE METHOD

CROSS-REFERENCE TO RELATED PATENT APPLICATIONS

This application is a continuation of U.S. patent application Ser. No. 15/323,307, filed Dec. 30, 2016, which is a National Stage Entry of International Application No. PCT/JP2015/065405, filed May 28, 2015, which claims priority from Japanese Patent Application No. 2014-134664, filed Jun. 30, 2014. The entire contents of the above-referenced applications are expressly incorporated herein by reference.

TECHNICAL FIELD

The present invention relates to a technique for guiding a crowd on the basis of information obtained by image analysis. Hereinafter, the term "crowd" as used herein refers to a plurality of people who are present in any space range. The number of people included in the crowd is not particularly limited as long as the number of people is plural, and the size of the space range is not also limited.

BACKGROUND ART

Patent Document 1 mentioned below proposes a customer guidance method in which a location where the number of people is smallest is set to be a guidance destination, a guidance robot is disposed at an inlet of a passage connected to the location, and bargain information of the guidance destination is displayed on the guidance robot and is output as a voice. According to the customer guidance method, it is possible to guide a shopper from a crowded place to an uncrowded place.

Patent Document 2 mentioned below proposes a system that provides an advertisement or music that is most effective for people in each section of a passage. In this system, a surveillance camera, a display monitor, a speaker, and the like are disposed for each section of a passage, and pieces of information regarding the number of people and attributes (male, female, child, and the like) in each section are obtained from an image captured by the surveillance camera. The most effective advertisement and music are provided from the display monitor and the speaker in each section on the basis of the pieces of information. When the system determines that there are a small number of people passing through a passage, the system plays comfortable music to guide the people into the passage.

Patent Document 3 mentioned below proposes a monitoring device that detects the number of people passing through a specific region and a direction of the passing with a high level of accuracy. Further, it is described that a plurality of devices calculating the degree of crowdedness in a room are installed inside a building to make a visitor know a room with a low degree of crowdedness.

RELATED DOCUMENT

Patent Document

[Patent Document 1] Japanese Unexamined Patent Publication No. 2008-132568

[Patent Document 2] Japanese Unexamined Patent Publication No. 2007-34585

[Patent Document 3] Japanese Unexamined Patent Publication No. H9-138241

SUMMARY OF THE INVENTION

The above-described guidance methods are merely to guide a specific crowd, such as people in a crowded place or new visitors, into a certain place such as a vacant place (a room, a passage, or the like). However, in such methods, a place being guidance destination immediately becomes crowded, and thus there is the possibility that a crowd cannot be appropriately guided.

The present invention is contrived in view of such situations, and an object thereof is to provide a technique for appropriately guiding a crowd.

In aspects of the present invention, the following configurations are adopted in order to solve the above-described problems.

A first aspect relates to a guidance processing apparatus. The guidance processing apparatus according to the first aspect includes an information acquisition unit acquiring a plurality of different pieces of guidance information on the basis of states of a plurality of people within one or more images, and a control unit that performing control of a plurality of target devices present in different spaces or time division control of a target device so as to set a plurality of different states corresponding to the plurality of pieces of guidance information.

A second aspect relates to a guidance method performed by at least one computer. The guidance method according to the second aspect includes acquiring a plurality of different pieces of guidance information on the basis of states of a plurality of people within one or more images, and performing control of a plurality of target devices present in different spaces or time division control of a target device so as to set a plurality of different states corresponding to the plurality of pieces of guidance information.

Meanwhile, another aspect of the present invention may be a program causing at least one computer to perform the method according to the second aspect, or may be a computer-readable recording medium having the program stored thereon. The recording medium includes a non-transitory tangible medium.

According to the above-described aspects, it is possible to provide a technique for appropriately guiding a crowd.

BRIEF DESCRIPTION OF THE DRAWINGS

The above-described objects, other objects, features and advantages will be further apparent from the preferred embodiments described below, and the accompanying drawings as follows.

FIG. 4 is a diagram showing an example of information stored in a storage unit according to the first exemplary embodiment.

FIG. 9 is a diagram showing an installation mode of surveillance cameras and display devices according to Example 4.

DESCRIPTION OF EMBODIMENTS

Hereinafter, exemplary embodiments of the present invention will be described. Meanwhile, the exemplary embodiments described below are merely illustrative of the present invention, and the present invention is not limited to the configurations of the following exemplary embodiments.

First Exemplary Embodiment

Hereinafter, a guidance system and a guidance method according to a first exemplary embodiment will be described with reference to a plurality of drawings.

System Configuration

Figure 1:
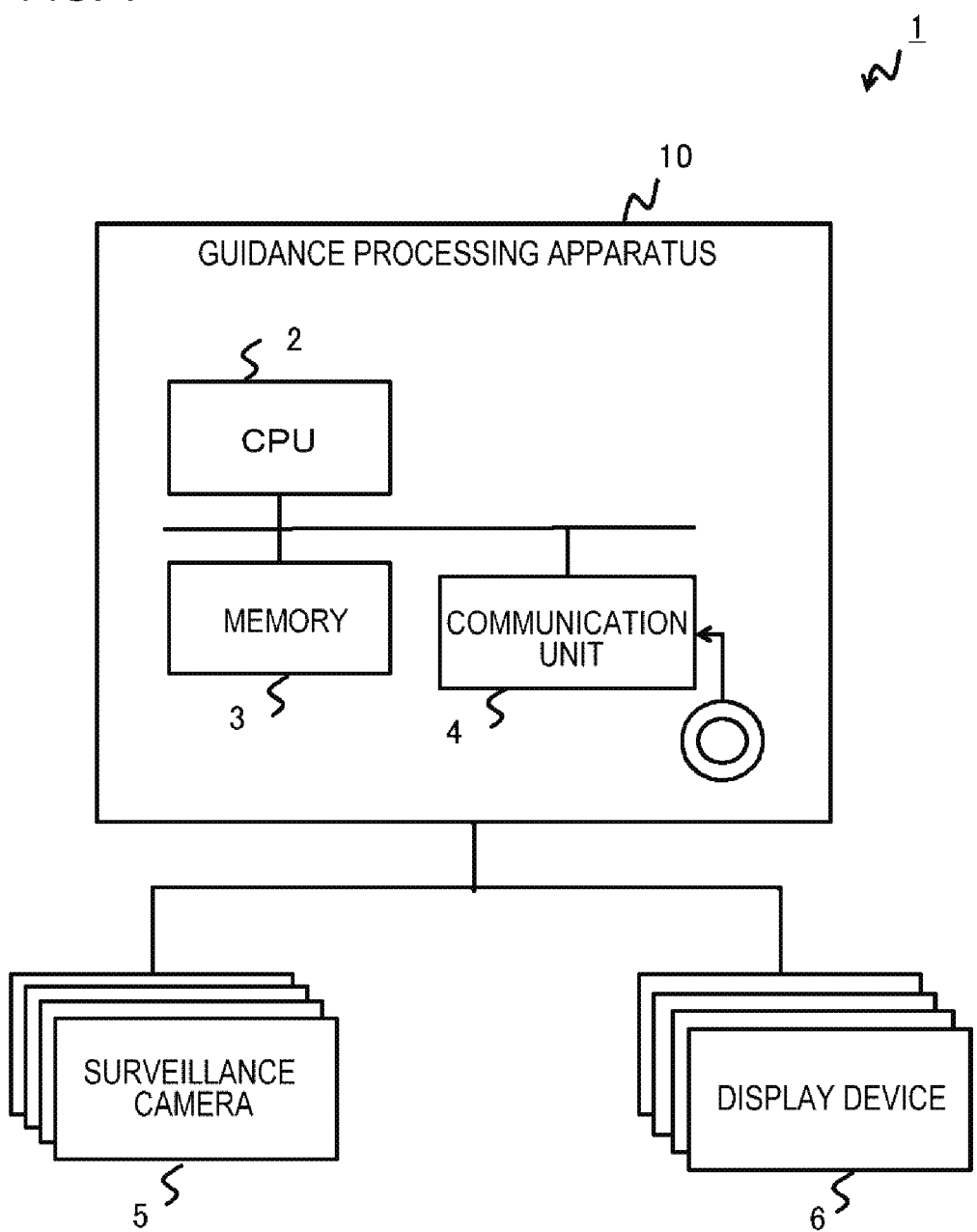
FIG. 1 is a schematic diagram showing a system configuration of a guidance system according to a first exemplary embodiment.

FIG. 1 is a schematic diagram showing a system configuration of a guidance system 1 according to the first exemplary embodiment. As shown in FIG. 1, the guidance system 1 includes a guidance processing apparatus 10, a plurality of surveillance cameras 5, a plurality of display devices 6, and the like. A target device in the first exemplary embodiment is a display device 6.

The guidance processing apparatus 10 is a so-called computer, and includes a central processing unit (CPU) 2, a memory 3, a communication unit 4, and the like that are connected to each other through a bus, as shown in FIG. 1. The memory 3 is a random access memory (RAM), a read only memory (ROM), or an auxiliary storage device (hard disk or the like). The communication unit 4 communicates with another computer through a communication network (not shown), and transmits and receives a signal to and from another device. A portable recording medium and the like can be connected to the communication unit 4. The guidance processing apparatus 10 may include a hardware element not shown in FIG. 1, and a hardware configuration of the guidance processing apparatus 10 is not limited.

Each of the surveillance cameras 5 is installed at a position and in a direction from which any place to be monitored can be imaged, and transmits an imaged video signal to the guidance processing apparatus 10. Hereinafter, a place imaged by the surveillance cameras 5 may be referred to as a monitored place or a target area. The number of surveillance cameras 5 is arbitrary. The surveillance cameras 5 are communicably connected to the guidance processing apparatus 10 through, for example, the communication unit 4. A communication mode and a connection mode between the surveillance cameras 5 and the guidance processing apparatus 10 are not limited.

Each of the display devices 6 displays a screen, such as a liquid crystal display (LCD) or a cathode ray tube (CRT) display, which corresponds to drawing data. The display device 6 can receive drawing data processed by the CPU 2, a graphics processing unit (GPU) (not shown), or the like included in the guidance processing apparatus 10 from the guidance processing apparatus 10 to display the screen corresponding to the drawing data. In addition, the display device 6 including a CPU or a GPU can process drawing data on the basis of data transmitted from the guidance processing apparatus 10 and can display a screen. A communication mode and a connection mode between the display devices 6 and the guidance processing apparatus 10 are not limited. Hereinafter, a range in which a person can visually perceive the display of each of the display devices 6 may be referred to as a display space of each of the display devices 6.

Figure 2:
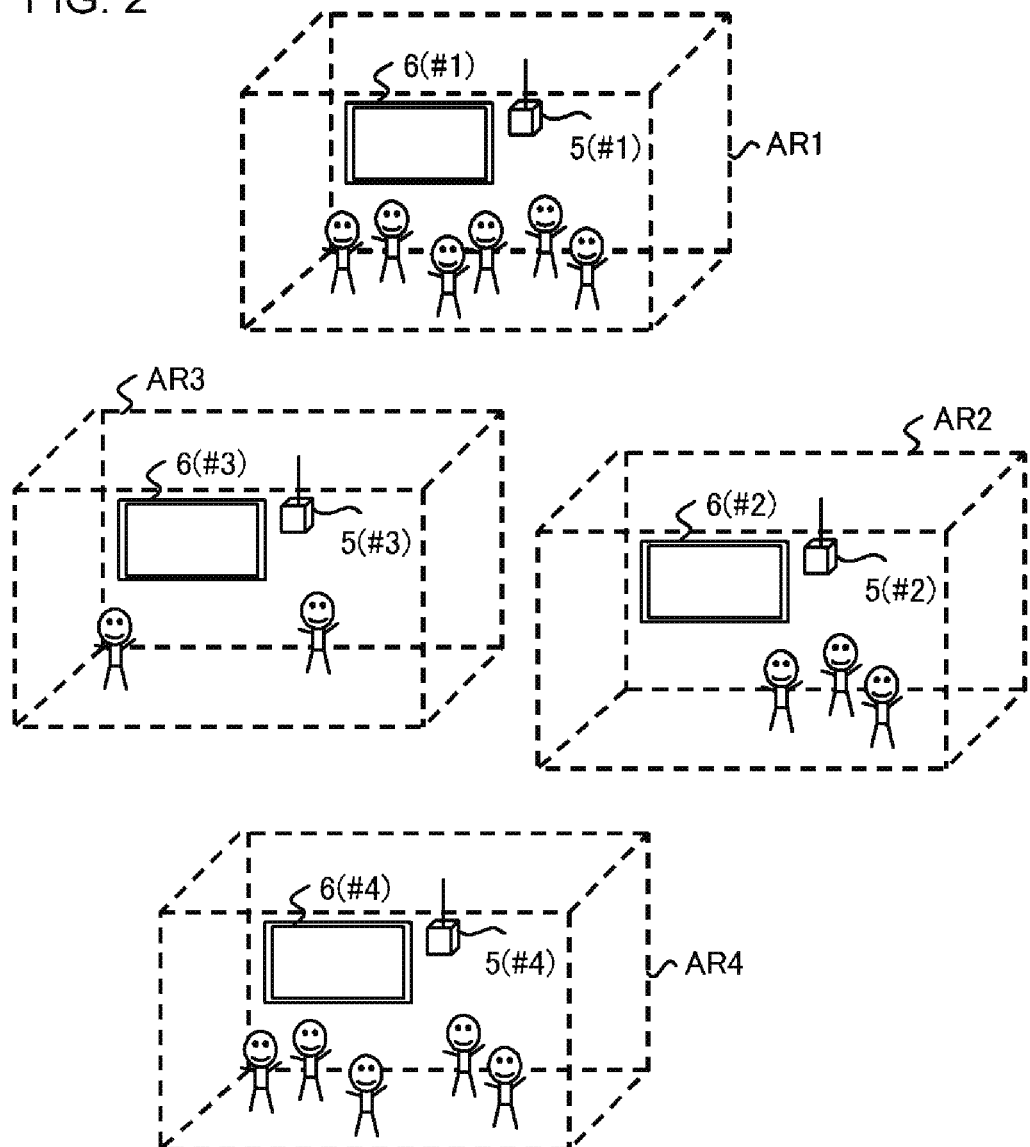
FIG. 2 is a diagram showing examples of an installation mode of surveillance cameras and display devices.

FIG. 2 is a diagram showing examples of an installation mode of the surveillance cameras 5 and the display devices 6. As described above, the surveillance cameras 5 image different monitored places. In the examples of FIG. 2, a surveillance camera 5 (#1) images an area AR1, a surveillance camera 5 (#2) images an area AR2, a surveillance camera 5 (#3) images an area AR3, and a surveillance camera 5 (#4) images an area AR4. A video signal imaged by each of the surveillance cameras 5 is transmitted to the guidance processing apparatus 10. In the examples of FIG. 2, the display devices 6 are installed at the respective monitored places in order to provide guidance information to a person being in each monitored place of the surveillance camera 5. In the examples of FIG. 2, a display device 6 (#1) provides guidance information to a person in the area AR1, a display device 6 (#2) provides guidance information to a person in the area AR2, a display device 6 (#3) provides guidance information to a person in the area AR3, a display device 6 (#4) provides guidance information to a person in the area AR4. According to the examples of FIG. 2, the areas AR1 to AR4 are handled as monitored places and display spaces. Here, installation modes of the surveillance cameras 5 and the display devices 6 are not limited to the examples shown in FIG. 2. Portions of monitored places may overlap each other for the plurality of surveillance cameras 5. In addition, there may exist a monitored place in which the display device 6 is not installed, and the display device 6 may be installed for people being in a plurality of monitored places. Further, the display device 6 may be installed in a place other than a monitored place.

Processing Configuration

Figure 3:
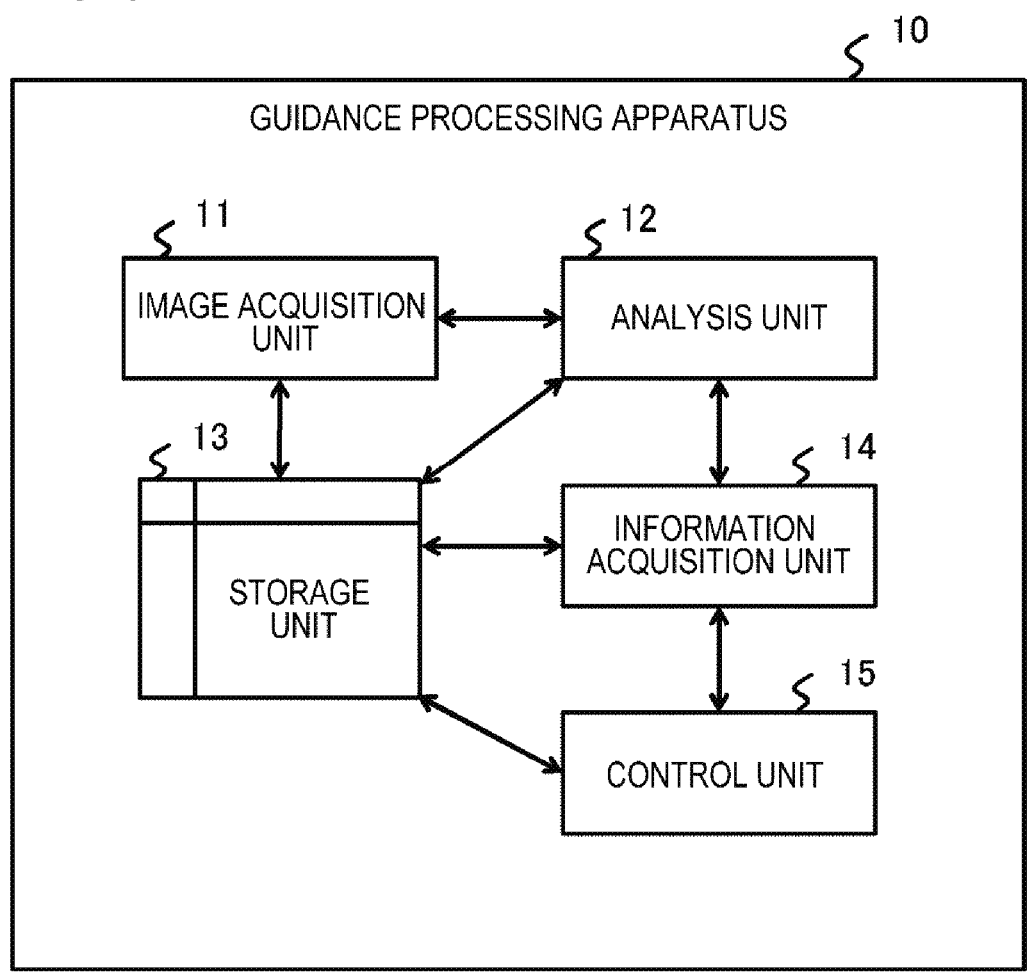
FIG. 3 is a schematic diagram showing an example of a processing configuration of a guidance processing apparatus according to the first exemplary embodiment.

FIG. 3 is a schematic diagram showing an example of a processing configuration of the guidance processing apparatus 10 according to the first exemplary embodiment. As shown in FIG. 3, the guidance processing apparatus 10 includes an image acquisition unit 11, an analysis unit 12, a storage unit 13, an information acquisition unit 14, a control unit 15, and the like. For example, each of these processing units is realized by executing a program stored in the memory 3 with the CPU 2. In addition, the program may be installed from a portable recording medium, such as a compact disc (CD) or a memory card, or another computer on a network through the communication unit 4 or an input and output I/F (not shown), and may be stored in the memory 3.

The image acquisition unit 11 acquires surveillance images captured by the respective surveillance cameras 5. Specifically, the image acquisition unit 11 captures a video signal applied from the surveillance camera 5 at any timing to thereby sequentially acquire surveillance images. The any timing is, for example, a predetermined period of time.

The analysis unit 12 analyzes a plurality of images obtained by capturing different target areas (monitored places) to thereby acquire states of a plurality of people in the respective target areas. The analysis unit 12 stores the acquired states in the storage unit 13.

The analysis unit 12 analyzes surveillance images, corresponding to the respective surveillance cameras 5, which are acquired by the image acquisition unit 11. Specifically, the analysis unit 12 detects people from the surveillance images using a well-known image recognition method. For example, the analysis unit 12 can hold feature data of an image describing a detection range of a person, and can detect a region in a surveillance image similar to the feature data as the detection range. However, a person detection method is not limited. The analysis unit 12 may detect the whole body of a person, or may detect a portion of a person such as the head, the face, the upper half of the body, or the like. Alternatively, the analysis unit 12 may collectively detect a crowd instead of detecting individual people. In this case, the analysis unit 12 can detect a crowd constituted by a plurality of people as a group without separating the crowd into individual people.

The analysis unit 12 acquires the state of a crowd within a surveillance image using results of the above-described detection of people with respect to the surveillance image. The analysis unit 12 can acquires the number of people, density, the degree of crowdedness, a moving speed, a moving direction, a flow rate, the presence or absence of a queue, the length of a queue, a waiting time of a queue, a speed at which a queue advances, the presence or absence of staying, a staying time, the number of staying people, the degree of dissatisfaction, an abnormal state, and the like, as the state of the crowd. The density is a value obtained by dividing the number of people by the largeness of the place imaged in the surveillance image. The degree of crowdedness is an index value indicating the degree of crowdedness of people being in a monitored place, and may be indicated by a value obtained by calculation using at least one of the number of people, the density, and both the number of people and the density. For example, the analysis unit 12 can estimate the number of people within a surveillance image using a crowd patch with a high level of accuracy.

The moving speed and the moving direction of the crowd can be acquired by measuring the movement of pixels between time-series surveillance images using a well-known technique such as object (person) tracking or optical flow. The flow rate can be calculated by multiplying a moving speed by the number of people. In addition, the analysis unit 12 can also acquire the presence or absence of a queue, the length of a queue, the presence or absence of staying, a staying time, and the number of staying people by using a well-known staying detection method. Further, the analysis unit 12 can acquire a waiting time of a queue, and a speed at which a queue advances in combination with a technique such as the above-described tracking.

The analysis unit 12 can acquire the degree of dissatisfaction of a crowd by using a staying time, the length of a queue, a waiting time of a queue, and the like. For example, it can be estimated that the degree of dissatisfaction of a crowd becomes higher as a staying time becomes longer, as a queue becomes longer, or as a waiting time of a queue becomes longer. In addition, the analysis unit 12 can estimate a look or an attitude on the basis of a person image region detected from a surveillance image, and can determine the degree of dissatisfaction from the estimated information. For example, in a case where a frown, an angry look, the raising of an arm, and the like are detected from the person image region, it can be estimated that the degree of dissatisfaction of the crowd is high. In addition, the analysis unit 12 can detect a change in the state of the crowd, and can detect an abnormal state of the crowd on the basis of the detected change in the state. For example, the analysis unit 12 can detects state such as squatting, turning around, and starting running, and can acquire the degree of abnormality of the crowd on the basis of the number of people causing the change.

The storage unit 13 stores identification information (ID) of the surveillance camera 5 and the state of a crowd which is extracted from surveillance images captured by the surveillance camera 5 in association with each other. A relationship between the ID of the surveillance camera 5 and the surveillance images can be recognized by the image acquisition unit 11, which acquires the surveillance image. This relationship and a relationship between surveillance images and the state of the crowd acquired using the surveillance images (the analysis unit 12) enable to associate the ID of the surveillance camera 5 with the state of the crowd. The storage unit 13 also further stores a relationship between the ID of the surveillance camera 5 and information indicating a monitored place of the surveillance camera 5. The storage unit 13 may store a positional relationship (a distance, an average moving time, and the like) between monitored places.

FIG. 4 is a diagram showing an example of information stored in the storage unit 13 according to the first exemplary embodiment. As shown in FIG. 4, the storage unit 13 may store information indicating a monitored place of the surveillance camera 5 and the state of the crowd in association with each other. In the example of FIG. 4, the degree of crowdedness indicated by a numerical value is used as the state of the crowd. Alternatively, each monitored place may be divided into smaller areas, and the degree of crowdedness may be stored in units of areas divided.

Further, the storage unit 13 stores identification information (ID) of the display device 6 and information indicating a location of a display space showing a range in which a person can visually perceive the display of the display device 6, in association with each other. The storage unit 13 may store a positional relationship (a distance, an average moving time, and the like) between the place of the display space and a monitored place.

On the basis of the state of the crowd in each monitored place acquired by the analysis unit 12, the information acquisition unit 14 generates pieces of guidance information corresponding to a positional relationship between monitored places, between display spaces of the respective display devices 6, and between each of the display spaces or each of the monitored places. For example, the information acquisition unit 14 generates guidance information corresponding to a positional relationship between monitored places in a case where a monitored place of each of the surveillance camera 5 and a display space of each of the display devices 6 substantially coincide with each other as shown in FIG. 2. The information acquisition unit 14 generates guidance information corresponding to a positional relationship between the display spaces or between each of the display spaces and each of the monitored places in a case where each monitored place and each display space are different from each other. Note that, a specific example of the generation of guidance information corresponding to a positional relationship between monitored places or a positional relationship between each of the display spaces and each of the monitored places will be described in detail in the term of Example.

The positional relationship includes a distance, directivity, a required moving time, and the like. The information acquisition unit 14 can acquire the positional relationship from the storage unit 13. The information acquisition unit 14 can also calculate a positional relationship from information indicating monitored places stored in the storage unit 13 and information indicating monitored places. For example, the distance may be stored in advance. The average moving time may be stored in the storage unit 13 in advance, or may be calculated using a moving speed of a crowd which is acquired by the analysis unit 12.

Conceptually, in a case where there exists a monitored place indicating an abnormal state of the crowd, the information acquisition unit 14 generates pieces of guidance information so that the state of the crowd of the monitored place become indicating a normal state. In addition, in a case where only a specific monitored place is severely different from the other monitored places as to the state of the crowd, the information acquisition unit 14 generates pieces of guidance information so that the state of the crowd become equalized.

In addition, the display devices 6 that are to display respective pieces of guidance information are also determined.

In the first exemplary embodiment, since guidance information is displayed by the display device 6, the guidance information is information indicating a guidance destination, information for promoting suspension, information indicating crowdedness conditions, and the like. Since a presentation of crowdedness conditions makes people avoid going to a place with a high degree of crowdedness, information indicating the crowdedness conditions may be handled as guidance information. As long as the guidance information is of capable of moving or suspending people as intended by the guidance system 1, the contents thereof are not limited. For example, the information capable of suspending people may include information for arousing interest to make people desire to stay in the place, such as music, a video, or information regarding an on-sale store. In addition, a time-limited discount coupon capable of being used in a specific store may also be an example of guidance information capable of making people stay in the specific store. It is preferable that pieces of guidance information having different contents are included in a plurality of pieces of guidance information generated by the information acquisition unit 14.

The control unit 15 displays pieces of guidance information on the respective display devices 6, on the basis of a correspondence relation between guidance information determined by the information acquisition unit 14 and the display device 6. In a case where pieces of guidance information are generated for all of the display devices 6, the control unit 15 displays the pieces of guidance information on all of the display devices 6. In a case where guidance information is generated for some of the display devices 6, the control unit 15 displays the pieces of guidance information on the some of the display devices 6. The control unit 15 can instruct the communication unit 4 to transmit guidance information to the display device 6, to thereby realize the display control of the display device 6. In addition, the control unit 15 can generate drawing data of guidance information and can also instruct the communication unit 4 to transmit the drawing data to the display device 6.

Example of Operation/Guidance Method

Figure 5:
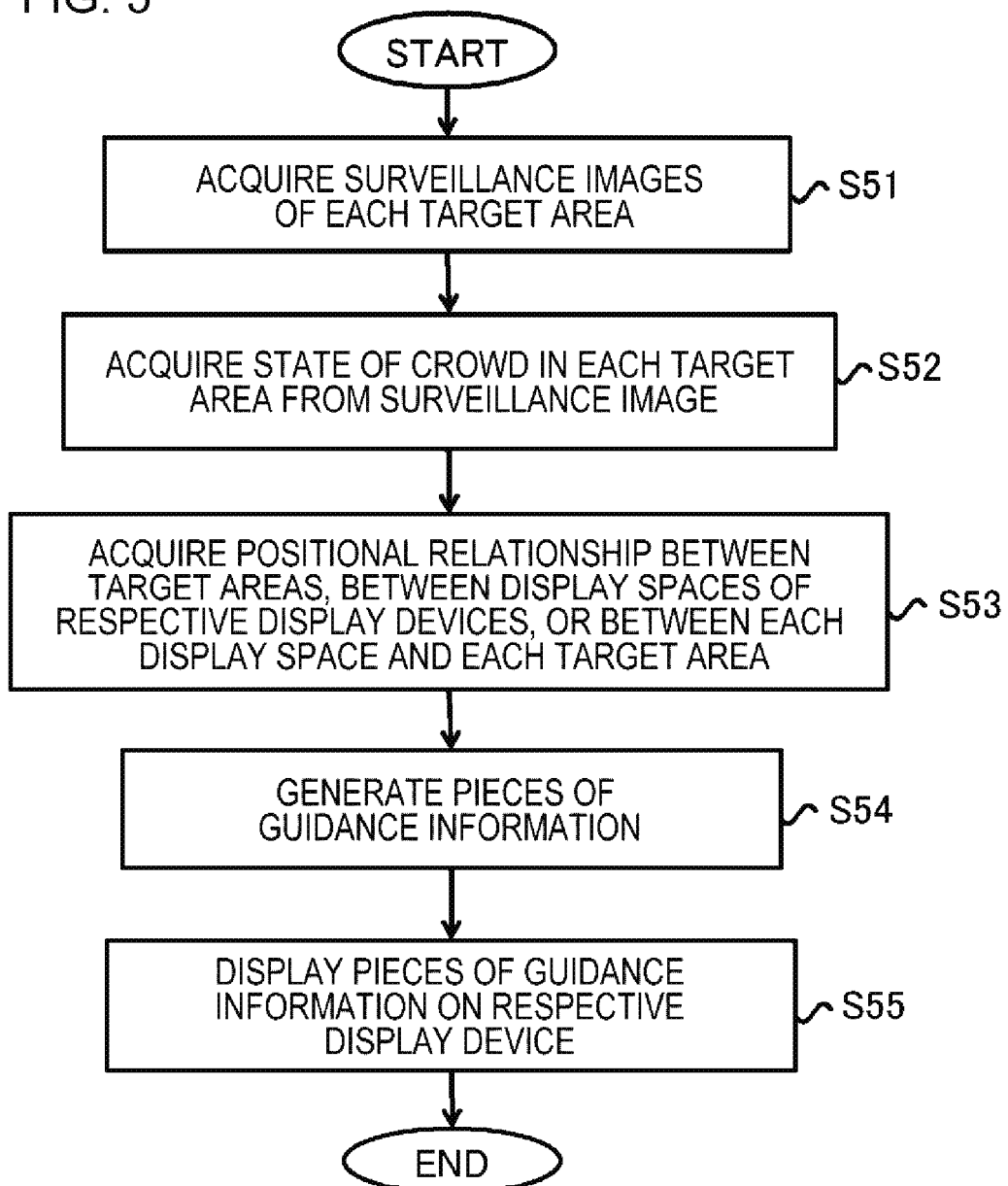
FIG. 5 is a flow chart showing an example of operation of the guidance processing apparatus according to the first exemplary embodiment.

Hereinafter, the guidance method according to the first exemplary embodiment will be described with reference to FIG. 5. FIG. 5 is a flow chart showing an example of operation of the guidance processing apparatus 10 according to the first exemplary embodiment. As shown in FIG. 5, the guidance method according to the first exemplary embodiment is realized by at least one computer such as the guidance processing apparatus 10. For example, steps shown in the figure are performed by processing units included in the guidance processing apparatus 10. The steps have contents that are the same as contents of the processing of the above-described processing units included in the guidance processing apparatus 10, and thus details of the steps will appropriately not be repeated here.

The guidance processing apparatus 10 acquires surveillance images captured by the respective surveillance cameras 5 (S51). The guidance processing apparatus 10 sequentially acquired the surveillance images in time series. The surveillance images are images obtained by capturing a target area (target monitored place) by the respective surveillance cameras 5.

The guidance processing apparatus 10 analyzes the surveillance images acquired in (S51) to thereby acquire the state of the crowd in the target area (S52). A method of analyzing surveillance images, the state of the crowd, and a method of acquiring the state of the crowd are as described above.

The guidance processing apparatus 10 acquires a positional relationship between target areas, between display spaces of the respective display devices 6, or between each of the display spaces and each of the target areas, on the basis of the state of the crowd in each of the target areas acquired in (S52) (S53).

The guidance processing apparatus 10 generates pieces of guidance information corresponding to the positional relationship acquired in (S53) on the basis of the state of the crowd in each of the target areas acquired in (S52) (S54). At this time, the guidance processing apparatus 10 determines the display device 6 that displays each piece of guidance information. The guidance processing apparatus 10 generates pieces of guidance information to be displayed on all of the display devices 6 or some of the display devices 6.

The guidance processing apparatus 10 displays the pieces of guidance information generated in (S54) on the respective display devices 6 (S55). Thereby, all of the display devices 6 or some of the display devices 6 display guidance information.

Advantageous Effects According to First Exemplary Embodiment

As described above, in the first exemplary embodiment, a plurality of surveillance images obtained by capturing target areas (monitored places) by the respective surveillance cameras 5 are acquired, and the state of the crowd in each of the target areas is acquired by analysis performed on each of the surveillance images. On the basis of the state of the crowd in each of the target areas, pieces of guidance information corresponding to a positional relationship between target areas, between display spaces of the respective display devices 6, or between each of the display spaces and each of the target areas are generated. And, the pieces of guidance information are respectively displayed by the corresponding display devices 6.

According to the first exemplary embodiment, it is possible to generate guidance information by adding the state of the crowd in a plurality of places (target areas). Further, it is possible to generate a plurality of pieces of guidance information corresponding to a positional relationship between the plurality of place (target area) about which the state of the crowd is acquired, between spaces in which guidance information is provided, or between each of the places and each of the spaces. Thereby, it is possible to provide different guidance information depending on a positional relationship with other places, for each display space. That is, according to the first exemplary embodiment, it is possible to guide a crowd using an appropriate method for each place, to eliminate a place in which the state of the crowd indicates an abnormal state, and to equalize the state of the crowd.

Hereinafter, in order to describe the first exemplary embodiment in more detail, a plurality of examples will be described. However, the contents of the above-described first exemplary embodiment are not limited to contents of the following examples.

Example 1

Figure 6:
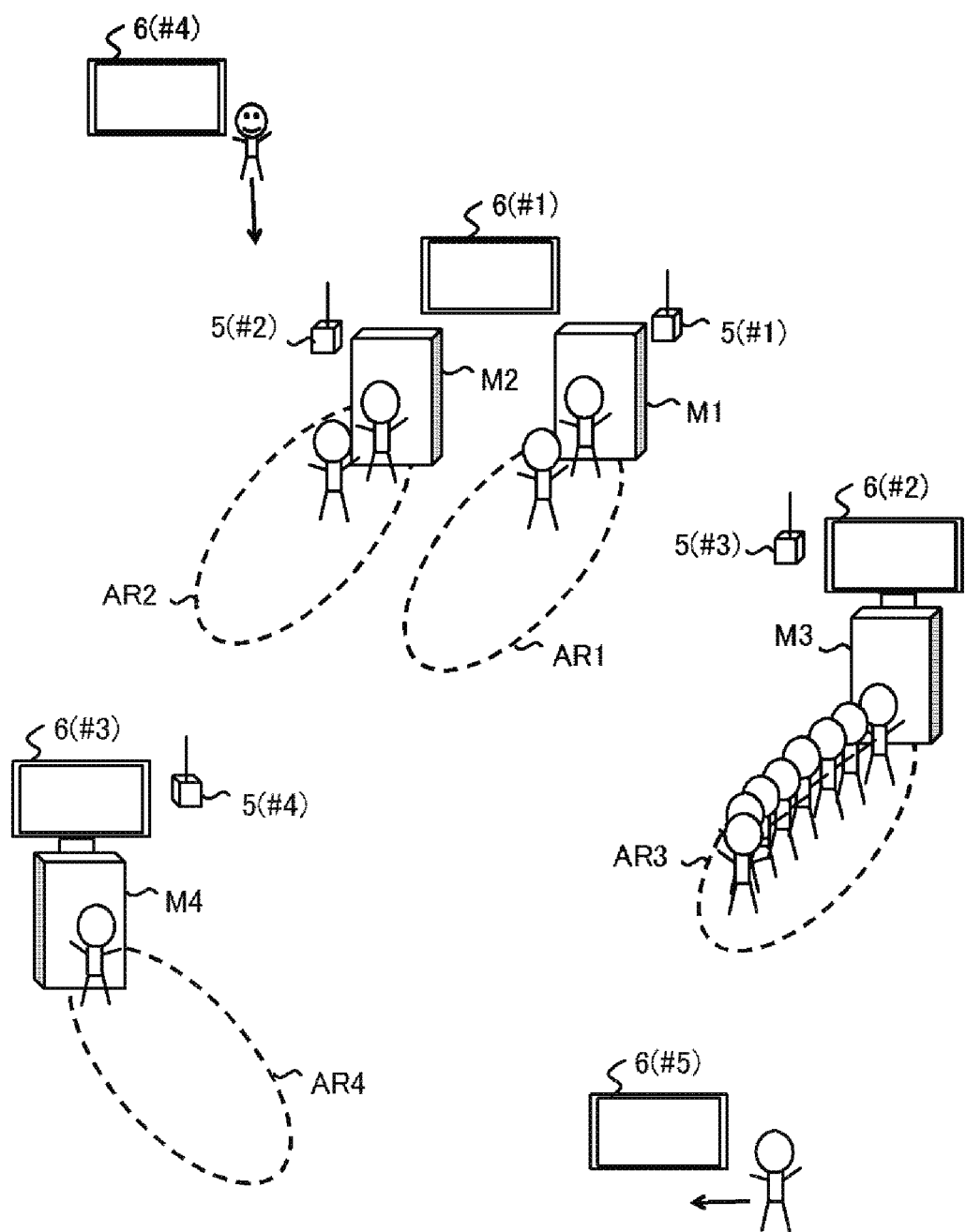
FIG. 6 is a diagram showing an installation mode of surveillance cameras and display devices according to Example 1.

FIG. 6 is a diagram showing an installation mode of surveillance cameras 5 and display devices 6 according to Example 1.

A guidance system 1 according to Example 1 appropriately guides user groups of ticket vending machines.

Each surveillance camera 5 images people lined up in front of each ticket vending machine. A surveillance camera 5 (#1) images a monitored place AR1 in front of a ticket vending machine M1, a surveillance camera 5 (#2) images a monitored place AR2 in front of a ticket vending machine M2, a surveillance camera 5 (#3) images a monitored place AR3 in front of a ticket vending machine M3, and a surveillance camera 5 (#4) images a monitored place AR4 in front of a ticket vending machine M4. The display space of a display device 6 (#1) is a space including the monitored places AR1 and AR2, the display space of a display device 6 (#2) is a space including the monitored place AR3, the display space of a display device 6 (#3) is a space including the monitored place AR4, and the display space of display devices 6 (#4) and 6 (#5) is a passage directed to the ticket vending machines.

In Example 1, an image acquisition unit 11 acquires a plurality of surveillance images obtained by capturing the monitored places AR1 to AR4. An analysis unit 12 analyzes the plurality of surveillance images to thereby acquire the degrees of crowdedness in the monitored places AR1 to AR4 as the state of the crowd. According to the example of FIG. 6, a high degree of crowdedness is acquired with respect to the monitored place AR3, and a low degree of crowdedness is acquired with respect to the monitored places AR1, AR2, and AR4.

Since the degree of crowdedness in the monitored place AR3 is high, an information acquisition unit 14 specifies the monitored place AR1 in which the degree of crowdedness is low and which is closest to the monitored place AR3 as a positional relationship between monitored places. This has the same meaning as specifying the ticket vending machine M1, which is closest to the ticket vending machine M3 and is not crowded. Thereby, the information acquisition unit 14 generates, as the guidance information for the display device 6 (#2) that includes the monitored place AR3 having a high degree of crowdedness in the display space, information for guiding to the ticket vending machine M1 corresponding to the monitored place AR1. For example, the guidance information indicates the ticket vending machine M1 being vacant, a direction of moving from the monitored place AR3 to the ticket vending machine M1, and a required moving time thereof.

Further, as a positional relationship between a display space and a monitored place, the information acquisition unit 14 specifies the monitored place AR2 which is closest to the display space of the display device 6 (#4) and has a low degree of crowdedness, and specifies the monitored place AR4 which is closest to the display space of the display device 6 (#5) and has a low degree of crowdedness. This is the same meaning as specifying a ticket vending machine which is closest to a certain passage and is not crowded. Thereby, the information acquisition unit 14 generates information for guiding to the ticket vending machine M2 corresponding to the monitored place AR2 as guidance information for the display device 6 (#4), and generates information for guiding to the ticket vending machine M4 corresponding to the monitored place AR4 as guidance information for the display device 6 (#5).

The control unit 15 displays the generated pieces of guidance information on the display devices 6 (#2), 6 (#4), and 6 (#5). Thereby, the display device 6 (#2) displays information for guiding to the ticket vending machine M1. As a result, people lined up in front of the ticket vending machine M3 recognize the presence of the nearby ticket vending machine M1 that is vacant, and would move in order to use the ticket vending machine M1. Therefore, it is possible to solve crowdedness in front of the ticket vending machine M3. In addition, the display device 6 (#4) displays information for guiding to the ticket vending machine M2, and the display device 6 (#5) displays information for guiding to the ticket vending machine M4. Accordingly, it is possible to direct people being about to use a ticket vending machine to a vacant ticket vending machine, and to equalize the degree of crowdedness in front of each ticket vending machine.

The contents of Example 1 can be applied to various places, such as a restroom, a kiosk, and a ticket gate, other than a ticket vending machine.

Example 2

Figure 7:
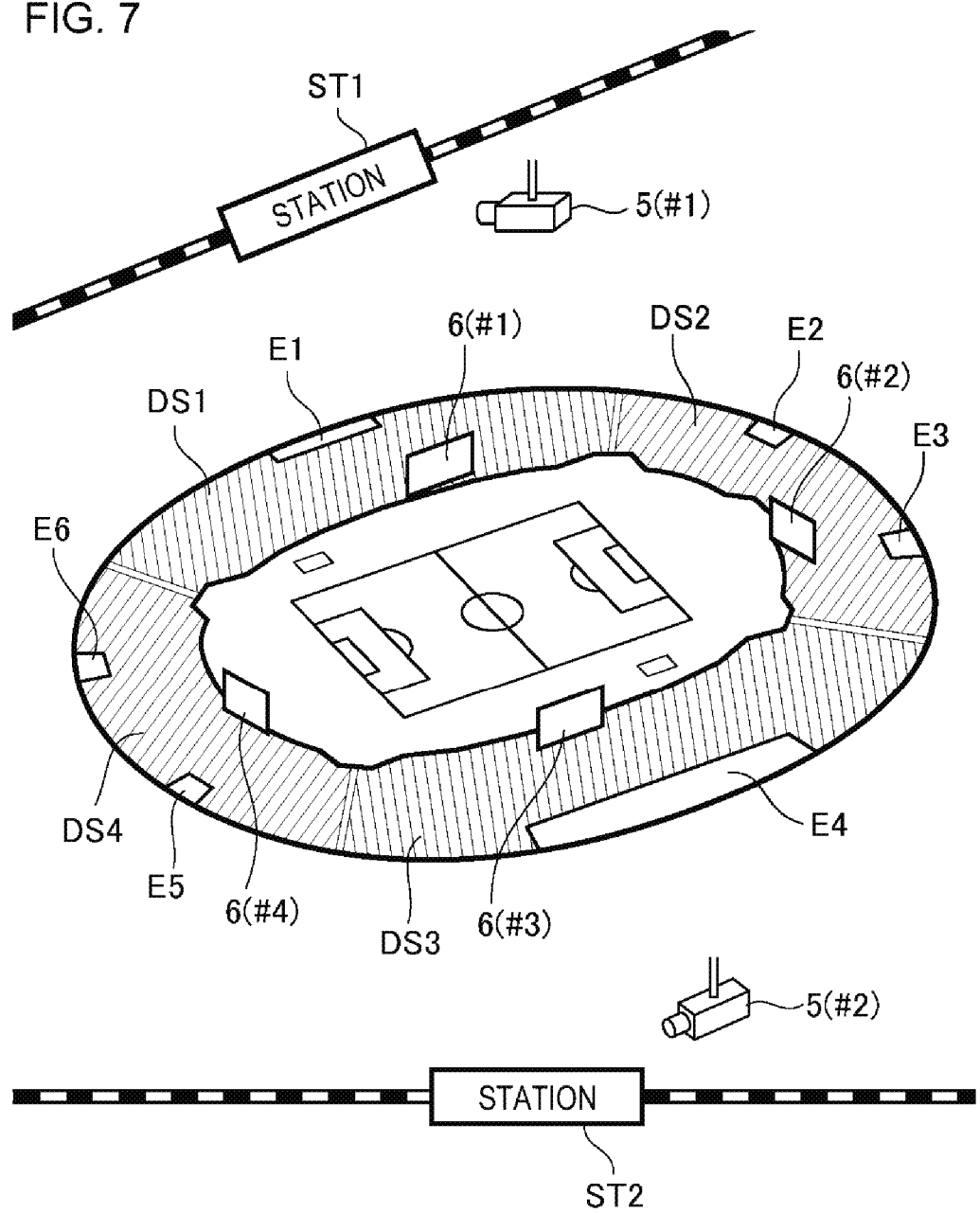
FIG. 7 is a diagram showing an installation mode of surveillance cameras and display devices according to Example 2.

FIG. 7 is a diagram showing an installation mode of surveillance cameras 5 and display devices 6 according to Example 2.

A guidance system 1 according to Example 2 appropriately guides a crowd who leaves a certain event hall (soccer stadium in the example of FIG. 7).

In Example 2, surveillance cameras 5 (#1) and 5 (#2) image people who use stations ST1 and ST2. The stations ST1 and ST2 are stations that are used by people who leave the hall. In Example 2, monitored places of the respective surveillance cameras 5 are not particularly limited as long as the degree of crowdedness in each of the stations ST1 and ST2 can be recognized from the monitored places. In the following description, the monitored place of the surveillance camera 5 (#1) is denoted by ST1, and the monitored place of the surveillance camera 5 (#2) is denoted by ST2.

The display device 6 is provided for each section of seats in order to show pieces of guidance information to visitors of the hall. A display device 6 (#1) includes a seat section DS1 in a display space, a display device 6 (#2) includes a seat section DS2 in a display space, a display device 6 (#3) includes a seat section DS3 in a display space, and a display device 6 (#4) includes a seat section DS4 in a display space.

Each of the seat sections is provided with an exit, and people who seat in each of the seat sections leave from the hall through the exit provided to the seat section. Specifically, the seat section DS1 is provided with the exit E1, the seat section DS2 is provided with the exits E2 and E3, the seat section DS3 is provided with the exit E4, and the seat section DS4 is provided with the exits E5 and E6.

In Example 2, an image acquisition unit 11 acquires a plurality of surveillance images obtained by capturing the monitored places ST1 and ST2. An analysis unit 12 analyzes the plurality of surveillance images to thereby acquire the degrees of crowdedness in the monitored places ST1 and ST2 as the state of the crowd. Here, suppose that a high degree of crowdedness is acquired for the monitored place ST1, and a low degree of crowdedness is acquired for the monitored place ST2.

An information acquisition unit 14 acquires a distance between the monitored place ST2 and each display space and a distance between the monitored place ST1 and each display space, as a positional relationship between a display space and a monitored place. At this time, the position of the exit provided to the seat section included in each display space is used for the position of each of the display spaces. Further, the information acquisition unit 14 calculates the magnitude (absolute value) of a difference between the distance to the monitored place ST1 and the distance to the monitored place ST2 with respect to each display space.

The information acquisition unit 14 specifies a display space closer to the monitored place ST2 than the monitored place ST1 because the degree of crowdedness in the monitored place ST1 is high and the degree of crowdedness in the monitored place ST2 is low. Here, suppose that the seat section DS3 is specified. Thereby, the information acquisition unit 14 generates information for guiding to the station of the monitored place ST2 as guidance information for the display device 6 (#3). Since each of the seat sections DS2 and DS4 is provided with two exits, it is assumed that the same proximity to either of the stations is determined. However, since the degree of crowdedness in the monitored place ST1 is high, the information acquisition unit 14 generates information for guiding to the station of the monitored place ST2 having a low degree of crowdedness, as guidance information for the display devices 6 (#2) and 6 (#4).

On the other hand, since a display space including the seat section DS1 is relatively close to the monitored place ST1, the information acquisition unit 14 determines whether or not a difference in distance exceeds a predetermined value. The information acquisition unit 14 generates information for guiding to the station of the monitored place ST1 having a high degree of crowdedness because the difference in distance exceeds the predetermined value. However, regarding a display space relatively close to the monitored place ST1 with a high degree of crowdedness, a guidance destination may be determined on the basis of a balance of the number of people for each guidance destination instead of being determined on the basis of the difference in distance. The information acquisition unit 14 may include the degrees of crowdedness of the stations ST1 and ST2, and the distance and the required moving time from the corresponding seat section to each station, in guidance information.

The control unit 15 displays the generated pieces of guidance information on the display devices 6 (#1) to 6 (#4). Thereby, the display device 6 (#1) displays information for guiding to the station ST1, and the display devices 6 (#2) to 6 (#4) display information for guiding to the station ST2. By doing so, it is possible to prevent a crowd leaving a hall from gathering to any one station. In addition, in a method of presenting a vacant station ST2 to all visitors, there may also be the possibility that the station ST2 is distant for visitors seating in the seat section DS1, or that the station ST2 is crowed when the visitors reach the station. However, according to Example 2, it is possible to appropriately guide the crowds since guidance information is generated taking into account a positional relationship between the seat section of the hall and the station.

Example 3

Figure 8:
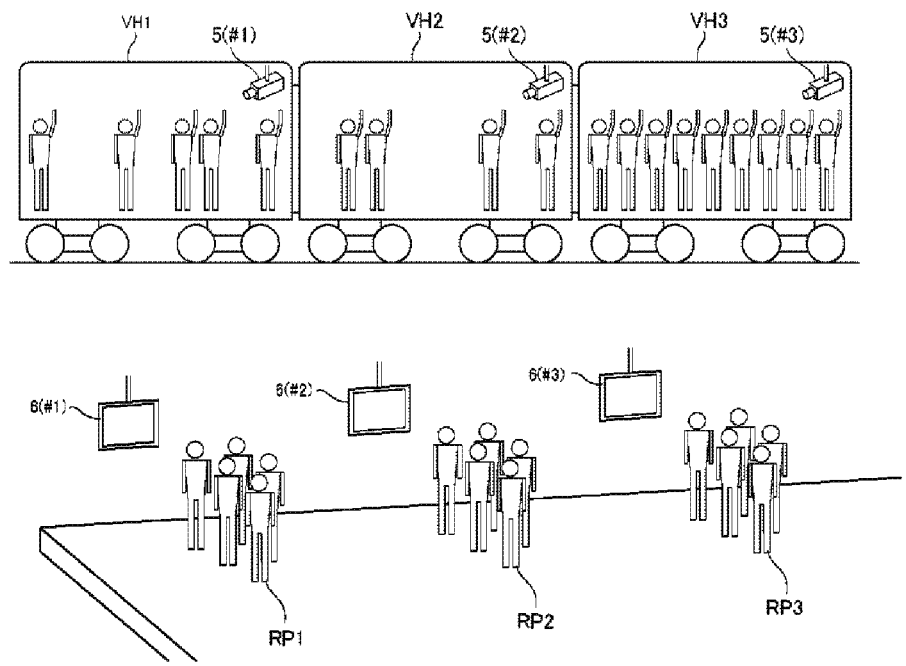
FIG. 8 is a diagram showing an installation mode of surveillance cameras and display devices according to Example 3.

FIG. 8 is a diagram showing an installation mode of surveillance cameras 5 and display devices 6 according to Example 3.

A guidance system 1 in Example 3 appropriately guides a crowd who waits for a train at a platform of a station.

In Example 3, each of the surveillance cameras 5 images the inside of each vehicle of a target train as a monitored place. Specifically, a surveillance camera 5 (#1) images the inside of a vehicle VH1, a surveillance camera 5 (#2) images the inside of a vehicle VH2, and a surveillance camera 5 (#3) images the inside of a vehicle VH3. In the following description, monitored places of the respective surveillance cameras 5 (#1) to 5 (#3) are denoted by VH1 to VH3, respectively.

Each of the display devices 6 includes a getting-on position for each vehicle at the platform in a display space. The display space of a display device 6 (#1) includes a getting-on position RP1 of a vehicle VH1, the display space of a display device 6 (#2) includes a getting-on position RP2 of a vehicle VH2, and the display space of a display device 6 (#3) includes a getting-on position RP3 of a vehicle VH3. In the following description, the display spaces of the respective display devices 6 (#1) to 6 (#3) are denoted by RP1 to RP3, respectively.

In Example 3, the image acquisition unit 11 acquires a plurality of surveillance images obtained by capturing the monitored places VH1 to VH3. The analysis unit 12 analyzes the plurality of surveillance images to thereby acquire the degrees of crowdedness in the respective monitored places VH1 to VH3 as the state of the crowd. Here, suppose that a low degree of crowdedness is acquired with respect to the monitored places VH1 and VH2, and a high degree of crowdedness is acquired with respect to the monitored place VH3.

The information acquisition unit 14 acquires a correspondence relation between each monitored place and each display space on the basis of a correspondence relation between each vehicle and a getting-on position for each vehicle. Specifically, the information acquisition unit 14 recognizes correspondence between the monitored place VH1 and the display space RP1, correspondence between the monitored place VH2 and the display space RP2, and correspondence between the monitored place VH3 and the display space RP3. Further, the information acquisition unit 14 recognizes that the display space PR3 is closer to the display space PR2 than the display space PR1, as a positional relationship between the display spaces.

Thereby, the information acquisition unit 14 generates information for guiding to the getting-on position PR2 that has the lowest degree of crowdedness and is closest thereto, as guidance information for the display device 6 (#3) of the getting-on position (display space) PR3 of the vehicle (monitored place) VH3 with a high degree of crowdedness. For example, the guidance information indicates information indicating the vehicle VH2 being empty and the getting-on position PR2 of the vehicles. Further, since the information acquisition unit 14 generates information for guiding from the getting-on position PR3 to the getting-on position PR2, the information acquisition unit may generate information for guiding to the getting-on position PR1 that has the lowest degree of crowdedness and is closest thereto, as guidance information for the display device 6 (#2) of the getting-on position PR2.

A control unit 15 displays the generated guidance information on the display device 6 (#3). Thereby, the display device 6 (#3) displays information for guiding to the getting-on position PR2. Thereby, it is possible to prevent passengers from gathering to a certain vehicle and to aim for the equalization of the number of passengers for each vehicle. Further, in a case where guidance information for the display device 6 (#2) is also generated, the display device 6 (#2) can display information for guiding to the getting-on position PR1. Thereby, people would move from the getting-on position PR3 to the getting-on position PR2 on the basis of the guidance information displayed on the display device 6 (#3), and thus it is possible to further prevent the vehicle VH2 from being crowded.

In the example of FIG. 8, the surveillance cameras 5 may image the getting-on positions PR1 to PR3 at the platform as monitored places. In this case, the analysis unit 12 can analyze surveillance images of the respective getting-on positions to thereby acquire left-behind conditions in the monitored places RP1 to RP3 as the state of the crowd. The analysis unit 12 estimates, as a left-behind condition, a condition of each getting-on position at which not all of the passengers get on the train in spite of the train coming. For example, the analysis unit 12 calculates a difference between the degrees of crowdedness at the respective getting-on position immediately before a train stops and immediately after the train departs, and determines the difference or a value calculated from the difference to be a left-behind condition. The difference becomes smaller as the number of people who can get on the train becomes smaller, and therefore the left-behind condition is calculated as larger value. Further, the analysis unit 12 may determine a left-behind condition by measuring the movement of a queue and in consideration of how much the queue moves forward.

In this case, the information acquisition unit 14 generates guidance information taking a left-behind condition at each getting-on position into account as an alternative to or in addition to the degree of crowdedness in each vehicle. In addition, in the example of FIG. 8, each of the display devices 6 may include each getting-on position in a display space, together with or instead of the inside of each vehicle.

Example 4

FIG. 9 is a diagram showing an installation mode of surveillance cameras 5 and display devices 6 according to Example 4.

A guidance system 1 according to Example 4 appropriately guides a crowd (passengers) who are getting on a train.

In Example 4, each of the surveillance cameras 5 images each ticket gate in a station as the monitored place. Specifically, a surveillance camera 5 (#1) images the vicinity of a ticket gate TG1, a surveillance camera 5 (#2) images the vicinity of a ticket gate TG2, and a surveillance camera 5 (#3) images the vicinity of a ticket gate TG3. In the following description, the monitored places of the respective surveillance cameras 5 (#1), 5 (#2), and 5 (#3) are denoted by TG1, TG2, and TG3, respectively.

The display space of each display device 6 includes the inside of each vehicle of a train. The display space of the display device 6 (#1) is the inside of a vehicle VH1, the display space of the display device 6 (#2) is the inside of a vehicle VH2, the display space of the display device 6 (#3) is the inside of a vehicle VH3, the display space of the display device 6 (#4) is the inside of a vehicle VH4, and the display space of the display device 6 (#5) is the inside of a vehicle VH5. In the following description, the display spaces of the respective display devices 6 (#1) to 6 (#5) are denoted by VH1 to VH5, respectively.

In Example 4, the image acquisition unit 11 acquires a plurality of surveillance images obtained by capturing the monitored places TG1 to TG3. The analysis unit 12 analyzes the plurality of surveillance images to thereby acquire the degrees of crowdedness in the monitored places TG1 to TG3 as the state of the crowd. Here, suppose that a low degree of crowdedness is acquired with respect to the monitored places TG1 and TG3, and a high degree of crowdedness is acquired with respect to the monitored place TG2.

The information acquisition unit 14 acquires a positional relationship between each monitored place and each display space on the basis of the correspondence relation between each vehicle and a stopping position of the vehicle at a platform. Specifically, the information acquisition unit 14 recognizes that the display spaces VH1 and VH2 are close to the monitored place TG1, the display spaces VH3 and VH4 are close to the monitored place TG2, and the display space VH5 is close to the monitored place TG3. Further, the information acquisition unit 14 recognizes that the display space VH2 is second closest to the monitored place TG2 next to the monitored place TG1, the display space VH3 is second closest to the monitored place TG1 next to the monitored place TG2, and the display space VH4 is second closest to the monitored place TG3 next to the monitored place TG2.

Thereby, the information acquisition unit 14 generates information for guiding to other vacant ticket gates, as guidance information for the display devices 6 (#3) and 6 (#4) of the vehicles (display spaces) VH3 and VH4 that stop in the vicinity of the ticket gate (monitored place) TG2 having the high degree of crowdedness. The information acquisition unit 14 generates information for guiding to the second closest ticket gate TG1 next to the ticket gate TG2 as guidance information for the display device 6 (#3), and generates information for guiding to the second closest ticket gate TG3 next to the ticket gate TG2 as guidance information for the display device 6 (#4).

The control unit 15 displays the generated pieces of guidance information on the display devices 6 (#3) and 6 (#4). Thereby, the display device 6 (#3) displays information for guiding to the ticket gate TG1, and the display device 6 (#4) displays information for guiding to the ticket gate TG3. Thereby, it is possible to prevent people from gathering to a certain specific ticket gate, and to distribute people passing through each ticket gate as much as possible. Further, since guidance information is displayed within each vehicle, people can ascertain the ticket gate to which they should go before getting off the vehicle, and thus it is possible to smoothly guide the crowd on the platform.

In the example of FIG. 9, each of the surveillance cameras 5 can also handles a passage of the station as the monitored place, instead of or together with the ticket gate. Note that, although the described example in FIG. 9 shows that guidance information is displayed on the display device 6 within the vehicle, the control unit 15 may display guidance information on a terminal carried by a passenger, such as a mobile phone, if it is possible to recognize on which vehicle the passenger currently is. That is, the control unit 15 provides the portable terminal of a user with the information suitable for the vehicle (which vehicle) on which the user is. Information regarding the vehicle on which each user is can be acquired from various sensors or a global positioning system (GPS) mounted on the portable terminal, can be acquired through the exchange of information between a device installed on the platform and the portable terminal, or the like.

Second Exemplary Embodiment

Hereinafter, the guidance system and the guidance method according to the second exemplary embodiment will be described with reference to a plurality of drawings. Hereinafter, the second exemplary embodiment will be described focusing on contents different from those of the first exemplary embodiment, and the same contents as those in the first exemplary embodiment will appropriately not be repeated. The following contents may be added to the contents of the above-described first exemplary embodiment or may be replaced with the contents of the first exemplary embodiment.

In the following description, a place for which the degree of crowdedness is acquired among monitored places captured by the surveillance camera 5 is referred to as a goal area (equivalent to a first target area), and a place through which people are likely to pass to reach the goal area is referred to as a midway area (equivalent to a second target area).

Processing Configuration

Figure 10:
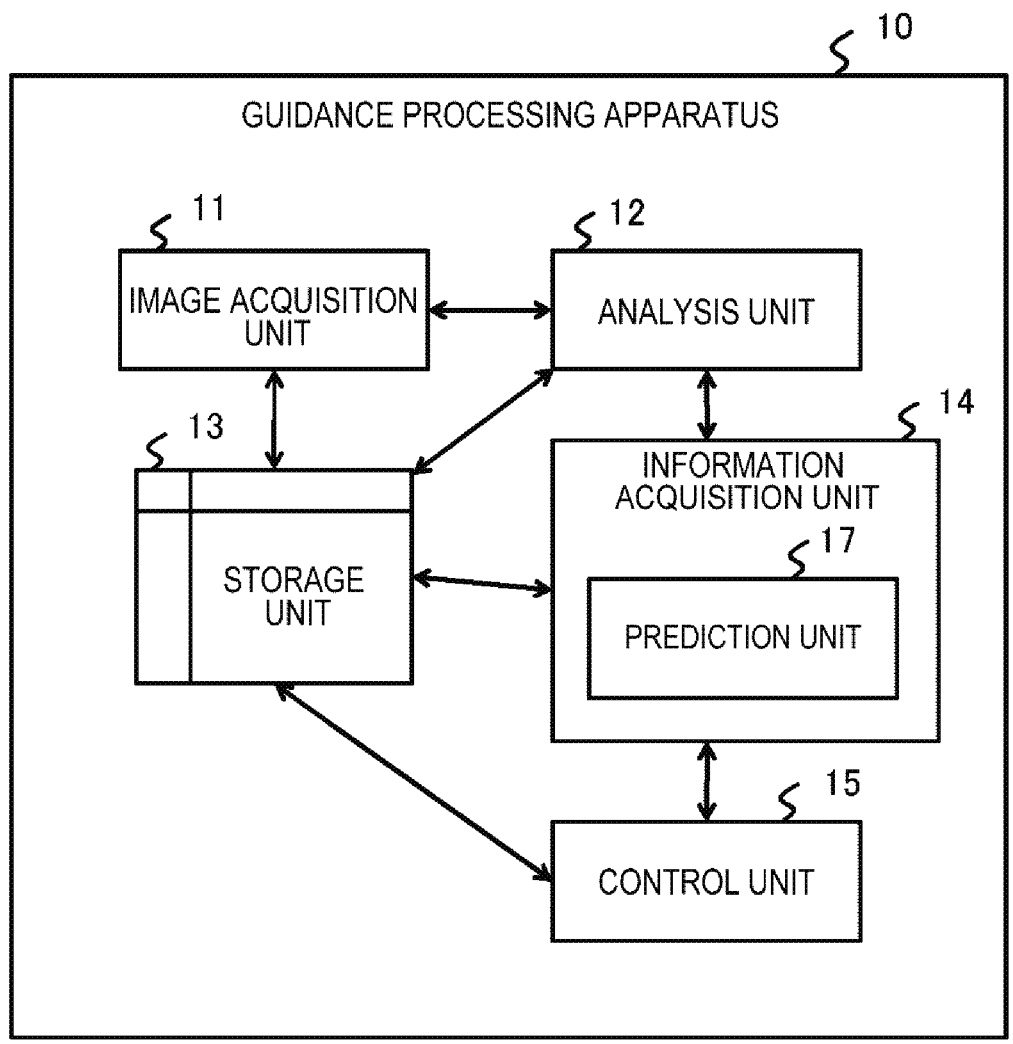
FIG. 10 is a schematic diagram showing an example of a processing configuration of a guidance processing apparatus according to a second exemplary embodiment.

FIG. 10 is a schematic diagram showing an example of a processing configuration of the guidance processing apparatus 10 according to the second exemplary embodiment. As shown in FIG. 10, the guidance processing apparatus 10 further includes a prediction unit 17 in addition to the configuration of the first exemplary embodiment. The prediction unit 17 is realized in the same manner as other processing units. In the example of FIG. 10, the prediction unit 17 is shown as a portion of the information acquisition unit 14, but may be realized as a processing unit which is separate from the information acquisition unit 14.

The analysis unit 12 analyzes the surveillance image, obtained by capturing the goal area, which is acquired by the image acquisition unit 11 to thereby acquire the degree of crowdedness of people in the goal area, and analyzes the image obtained by capturing the midway area to thereby acquire the flow rate of people in the midway area. Methods of acquiring the flow rate and the degree of crowdedness are as described above. The analysis unit 12 may acquire the flow rate only with respect to people the moving direction of which indicates the direction towards the goal area, by estimating the moving direction of people in the surveillance image of the midway area.

The storage unit 13 stores histories of the degree of crowdedness in the goal area and the flow rate in the midway area that are acquired by the analysis unit 12. Further, as the positional relationship between the display space and the monitored place, the storage unit 13 stores the distance between each display space and the goal area, or stores the time required for a person to move from each display space to the goal area.

The prediction unit 17 acquires a predicted degree of crowdedness of people in a goal area at any point in time on the basis of the degree of crowdedness in the goal area and the flow rate in the midway area which are acquired by the analysis unit 12. It is considered that the flow rate in the midway area obtained from the surveillance image captured at a certain time T describes the number of people reaching the goal area after the required time ($\Delta T$) for moving from the midway area to the goal area. Thereby, the prediction unit 17 can acquire a predicted degree of crowdedness in the goal area at any point in time, for example, as follows. The prediction unit 17 learns a correlation between the degree of crowdedness in the goal area obtained from the surveillance image captured at a time ($T+\Delta T$) and the flow rate in the midway area obtained from the surveillance image captured at a time T, on the basis of history data stored in the storage unit 13. The prediction unit 17 generates a function f(t) for predicting the degree of crowdedness in the goal area at any time t as the predicted degree of crowdedness on the basis of the learning.

The information acquisition unit 14 acquires, as the guidance information for each display space, the predicted degree of crowdedness in the goal area at the point in time when a person in each display space will reach the goal area in the future, using each time required for a person to move from the display space of each display device 6 to the goal area and the predicted degree of crowdedness acquired by the prediction unit 17. For example, in a case where a function f(t) of the predicted degree of crowdedness is obtained by the prediction unit 17, the information acquisition unit 14 can acquire the predicted degree of crowdedness $f(tc+\Delta r)$ in a goal area using the current point in time tc and each required time $\Delta r$.

The information acquisition unit 14 may calculate each required time with respect to each display space by using a moving speed acquired by the analysis unit 12 together with a flow rate. In this case, the information acquisition unit 14 may acquire the distance from each display space to the goal area from the storage unit 13.

In addition, in a case where the midway area (monitored place) and the display space coincides with each other, the information acquisition unit 14 may further increase the predicted degree of crowdedness for the display space coinciding with the midway area, on the basis of the flow rate acquired by the analysis unit 12 with respect to the midway area. For example, the information acquisition unit 14 handles, as eventual guidance information, a value obtained by multiplying a weight value corresponding to the flow rate by the predicted degree of crowdedness calculated using the required time for moving from the midway area to the goal area. For example, the information acquisition unit 14 calculates $f(tc+\Delta r) \times (1.0+\alpha)$ as guidance information using the value α that increases as the flow rate becomes higher. Accordingly, it is possible to increase an effect of suppressing movement to the goal area in the display space.

The control unit 15 outputs the predicted degree of crowdedness in the goal area acquired with respect to each display space, to each of the display devices 6. Thereby, each of the display devices 6 displays the predicted degree of crowdedness corresponding to the distance to the goal area.

Example of Operation/Guidance Method

Figure 11:
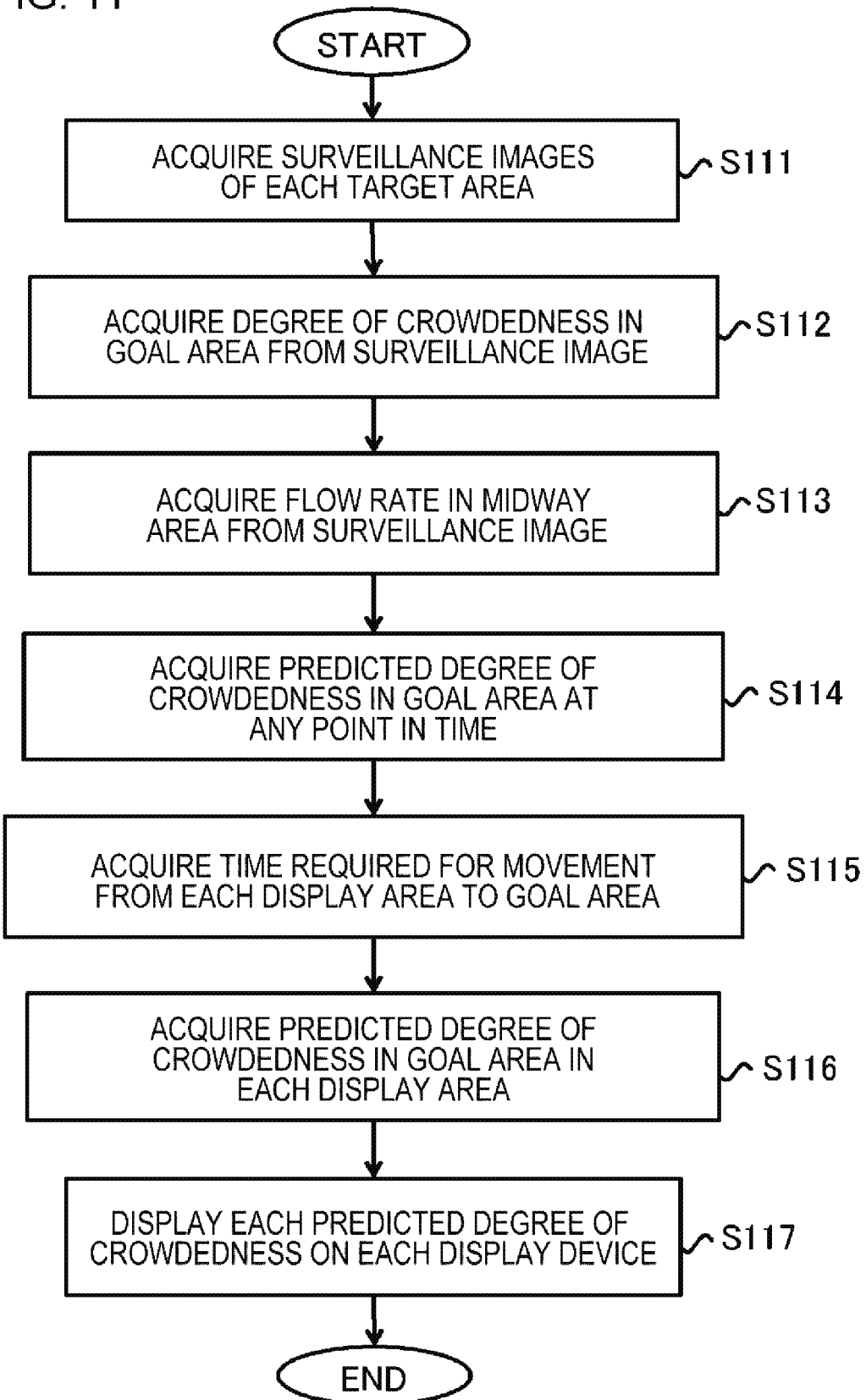
FIG. 11 is a flow chart showing an example of operation of the guidance processing apparatus according to the second exemplary embodiment.

Hereinafter, the guidance method according to the second exemplary embodiment will be described with reference to FIG. 11. FIG. 11 is a flow chart showing an example of operation of the guidance processing apparatus 10 according to the second exemplary embodiment. The subject of executing the guidance method according to the second exemplary embodiment is the same as that in the first exemplary embodiment. Steps are the same as contents of processing of the above-described processing units included in the guidance processing apparatus 10, and thus details of the steps will be appropriately omitted here.

The guidance processing apparatus 10 acquires surveillance images captured by the surveillance cameras 5 (S111). The guidance processing apparatus 10 sequentially acquires the surveillance images in time series. The acquired surveillance images include an image obtained by capturing the goal area and an image obtained by capturing a midway area.

The guidance processing apparatus 10 analyzes the surveillance images of the goal area acquired in (S111) to thereby acquire the degree of crowdedness in the goal area (S112). Further, the guidance processing apparatus 10 analyzes the surveillance images of the midway area acquired in (S111) to thereby acquire the flow rate in the midway area (S113). A method of analyzing surveillance images and methods of acquiring the degree of crowdedness and the flow rate as the state of the crowd are as described in the first exemplary embodiment.

The guidance processing apparatus 10 acquires the predicted degree of crowdedness in the goal area at any point in time on the basis of histories of the degree of crowdedness in the goal area acquired in (S112) and the flow rate of the midway area acquired in (S113) (S114).

Further, the guidance processing apparatus 10 acquires a time required for a person to move from the display area of each of the display devices 6 to the goal area (S115).

The guidance processing apparatus 10 acquires the predicted degree of crowdedness in the goal area at the current point in time for each display space as guidance information, using the predicted degree of crowdedness at any point in time acquired in (S114) and the required times acquired in (S115) (S116). At this time, in a case where the midway area (monitored place) and the display space coincides with each other, the guidance processing apparatus 10 may further increase the predicted degree of crowdedness for the display space coinciding with the midway area, on the basis of the flow rate acquired with respect to the midway area in (S113).

The guidance processing apparatus 10 displays the predicted degrees of crowdedness acquired in (S116) on the respective display devices 6 (S117).

In FIG. 11, a plurality of steps (processes) are shown in order, but steps performed in the second exemplary embodiment and the order of execution of the steps are not limited to only those in the example of FIG. 11. Steps (S112) and (S113) may be asynchronously performed at any timing. In addition, (S114) may be executed in accordance with a condition in which a history is stored in the storage unit 13 without depending on execution timings of (S111) to (S113).

In addition, (S115) may be performed once as long as the positions of the display area and the goal area do not change. Naturally, the required time may be changed in accordance with acquired speed information. In this case, (S115) may be performed on a regular basis after (S112) and (S113) are performed. Further, (S116) and (S117) may be performed at any timing without depending on execution timings of (S111) to (S115).

Advantageous Effects According to Second Exemplary Embodiment

As described above, in the second exemplary embodiment, the predicted degree of crowdedness in the goal area at any point in time is acquired from the history of the degree of crowdedness in the goal area acquired from the surveillance images and the history of the flow rate of the midway area acquired from the surveillance images. The predicted degree of crowdedness in the goal area in each display space is acquired on the basis of the predicted degree of crowdedness at any point in time and the time required for a person to move from each display area to the goal area. The predicted degree of crowdedness in the goal area acquired with respect to the display space is displayed on each of the display devices 6.

Thereby, there is the possibility that each crowd having viewed the display of each of the display devices 6 ascertains the predicted degree of crowdedness in the goal area to which the crowd is going and changes the current goal area to another area. This is because the level of the predicted degree of crowdedness may be a motivation for changing the moving destination from the goal area to another area. Here, instead of the degree of crowdedness at that time, the predicted degree of crowdedness at the point in time when people having viewed the display of the display device 6 will reach the goal area is presented. Therefore, according to the second exemplary embodiment, it is possible to avoid a situation where the crowd recognizes the goal area being crowded after the crowd reaches the goal area, and to appropriately guide the crowd while preventing the crowdedness of a specific area in advance.

Hereinafter, an example for describing the second exemplary embodiment in more detail will be described. However, the contents of the above-described second exemplary embodiment are not limited to contents of the following example.

Example 5

In Example 5, a portable terminal of a user is used as the display device 6. The portable terminal used as the display device 6 is an ordinary portable computer such as a laptop personal computer (PC), a mobile phone, a smart phone, or a tablet terminal. In Example 5, the guidance processing apparatus 10 and each portable terminal are communicably connected to each other through a communication network such as a mobile phone line network, a Wi-Fi line network, or an Internet communication network.

In Example 5, the information acquisition unit 14 acquires positional information and moving speed information of each portable terminal, and estimates the time required for each user holding the portable terminal to reach the goal area, using the acquired positional information and moving speed information. The information acquisition unit 14 can acquire pieces of positional information and moving speed information from other computers that collect the pieces of information from portable terminals. Alternatively, the information acquisition unit 14 can also directly acquire the pieces of information from the portable terminals. The moving speed information may be calculated by a sensor mounted on the portable terminal or may be calculated using Global Positioning System (GPS).

In addition, the information acquisition unit 14 acquires positional information of the goal area of each portable terminal. The information acquisition unit 14 can display a screen for specifying the goal area on each portable terminal and can detect a specifying operation at the screen, and thereby determining the goal area. In a case where the goal area is determined in advance, the information acquisition unit 14 may acquire positional information of the goal area stored in the storage unit 13. The information acquisition unit 14 calculates the distance from the position of each portable terminal to the goal area and divides the distance by the moving speed to thereby calculate the time required for the user holding the portable terminal to reach the goal area. Alternatively, when moving by train or the like, the information acquisition unit 14 may recognize which train is got on from a change in positional information, and may calculate the required time based on the arrival time at the destination (or the vicinity thereof) of the train.

The information acquisition unit 14 acquires the predicted degree of crowdedness in the goal area at a point in time when each user will reach the goal area in the future, with respect to each portable terminal, on the basis of the predicted degree of crowdedness in the goal area at any point in time acquired by the prediction unit 17 and the required time calculated as described above.

The control unit 15 displays the predicted degrees of crowdedness of the goal area on the respective portable terminals.

According to Example 5, it is possible to provide the predicted degree of crowdedness in the goal area with a high level of accuracy in accordance with the position and the moving speed of each individual person of the crowd. Even when the goal area is different for each individual person, it is possible to provide the predicted degree of crowdedness in each goal area on each portable terminal. Therefore, it is possible to appropriately guide the crowd in accordance with the state of each individual person.

Third Exemplary Embodiment

Hereinafter, the guidance system and the guidance method according to the third exemplary embodiment will be described with reference to a plurality of drawings. Hereinafter, the third exemplary embodiment will be described focusing on contents different from those described above, and the same contents as those described above will appropriately not be repeated. The following contents may be added to the contents described above or may be replaced with the contents described above.

In the following description, a plurality of monitored places captured by the plurality of surveillance cameras 5 may be referred to as other names as follows on the basis of the positional relationship between monitored places. Another monitored place positioned in the vicinity of a certain monitored place is referred to as peripheral area with respect to the certain monitored place, and the certain monitored place is referred to as central area. A monitored place handled as central area in all monitored places may be all of the monitored places or may be a portion thereof.

Figure 12:
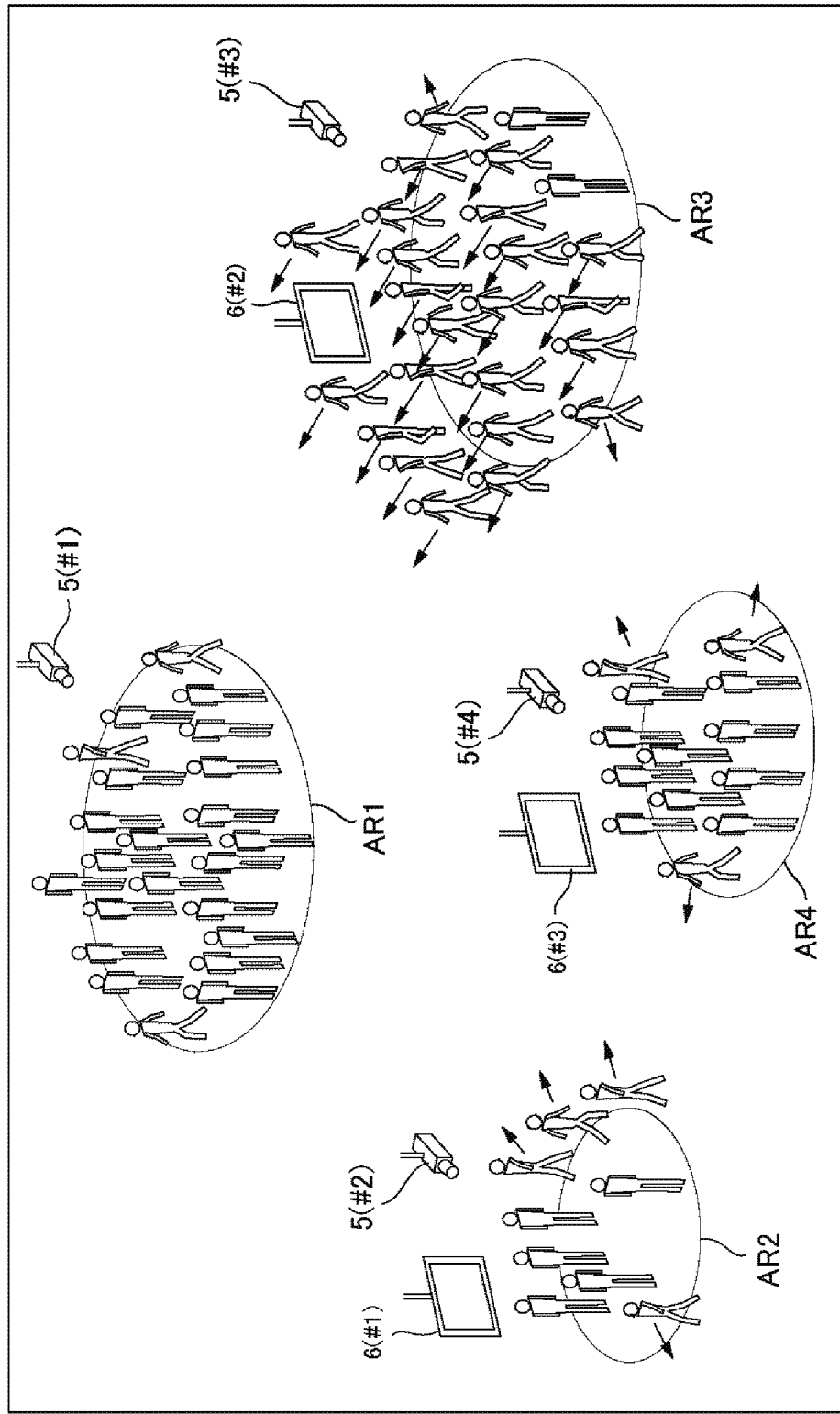
FIG. 12 is a diagram showing an installation mode of surveillance cameras and display devices according to a third exemplary embodiment.

FIG. 12 is a diagram showing an installation mode of surveillance cameras 5 and display devices 6 according to the third exemplary embodiment. In the example of FIG. 12, an area AR1 is a monitored place handled as the central area, and areas AR2 to AR4 are monitored places handled as the peripheral areas of the central area. A surveillance camera 5 (#1) images the central area AR1, and surveillance cameras 5 (#2) to 5 (#4) image the peripheral areas AR2 to AR4. The example of FIG. 12 can be applied to theme parks and parks. For example, the central area AR1 is the place of popular attractions in a theme park, and the peripheral areas AR2 to AR4 are a portion of a route headed to the popular attractions. In addition, the central area AR1 is the place of popular play equipment in the park, and the peripheral areas AR2 to AR4 are places of unpopular play equipment.

In the third exemplary embodiment, the plurality of display devices 6 are installed so as to include a display space including the monitored place handled as the peripheral area, as shown in the example of FIG. 12. In the example of FIG. 12, each of the display devices 6 (#1) to 6 (#3) includes a display space including a peripheral area.

Processing Configuration

Figure 13:
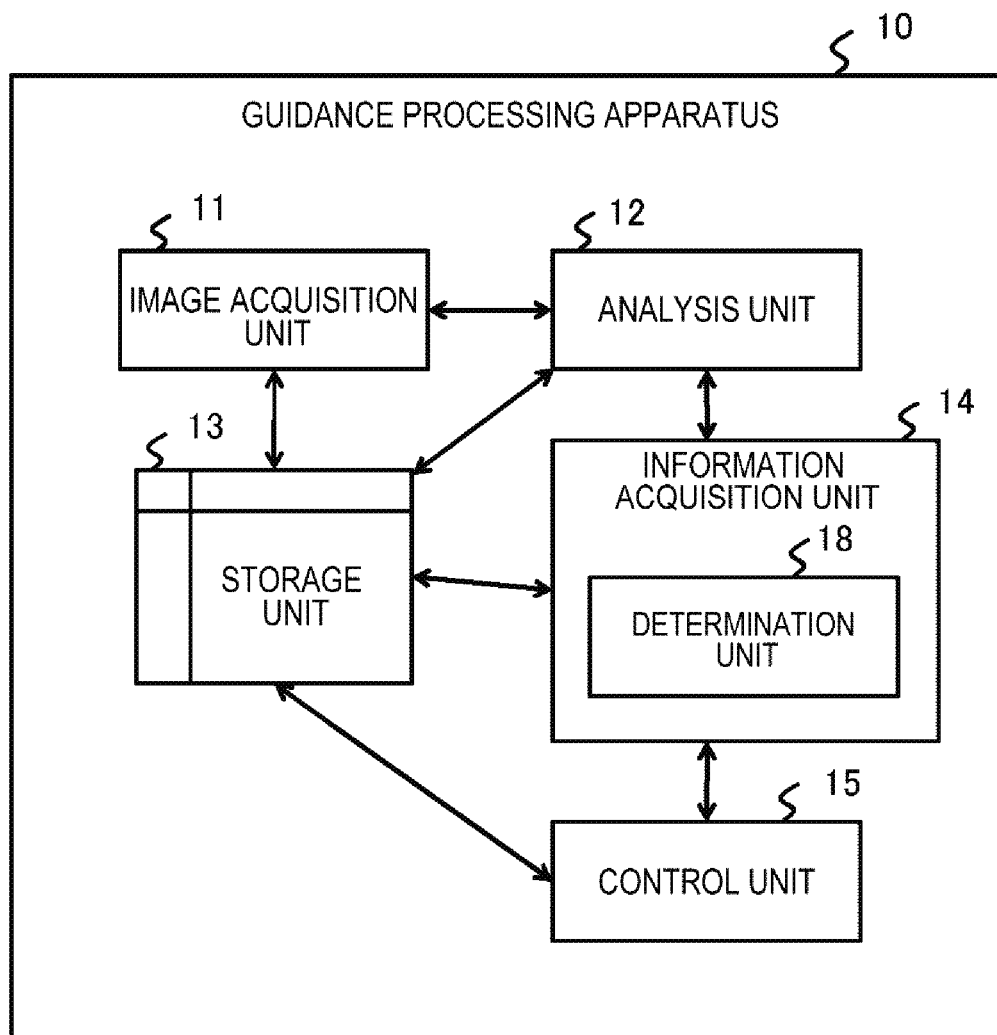
FIG. 13 is a schematic diagram showing an example of a processing configuration of a guidance processing apparatus according to the third exemplary embodiment.

FIG. 13 is a schematic diagram showing an example of a processing configuration of the guidance processing apparatus 10 according to the third exemplary embodiment. As shown in FIG. 13, the guidance processing apparatus 10 further includes a determination unit 18 in addition to the configuration of the first exemplary embodiment. The determination unit 18 is realized in the same manner as other processing units. In the example of FIG. 13, the determination unit 18 is shown as a portion of the information acquisition unit 14, but may be realized as a processing unit which is separate from the information acquisition unit 14. In addition, FIG. 13 shows a configuration in which the determination unit 18 is added to the processing configuration in the first exemplary embodiment, but the determination unit 18 may be added to the processing configuration in the second exemplary embodiment.

An analysis unit 12 analyzes surveillance images to thereby acquire the degree of crowdedness and the moving direction of a person with respect to respective monitored places (target areas). The analysis unit 12 may acquire the degree of crowdedness with respect to each monitored place handled as the central area, and may acquire the degree of crowdedness and the moving direction with respect to each monitored place handled as the peripheral area of at least one central area. Methods of acquiring the degree of crowdedness and the moving direction are as described above. However, since there is the possibility of a plurality of moving directions being detected from the surveillance images, the analysis unit 12 can acquire the largest direction detected as the moving direction of the surveillance images. In addition, the analysis unit 12 can also acquire the number of people (the degree of crowdedness) for each moving direction.

The storage unit 13 stores histories of the degree of crowdedness and the moving direction acquired from the surveillance images captured by the surveillance camera 5, in association with information indicating the monitored place of the surveillance camera 5. In addition, the storage unit 13 stores information regarding a relationship between the central area and the peripheral area. According to the example of FIG. 2, the storage unit 13 stores relationship information in which the monitored place AR2 and AR3 are handled as the peripheral areas with respect to the monitored place AR1 handled as the central area, and stores relationship information in which the monitored places AR1, AR3, and AR4 handled as the peripheral areas with respect to the monitored place AR2 handled as the central area.

The determination unit 18 determines the degree of influence of each peripheral area on the degree of crowdedness in a central area with respect to each monitored place handled as the central area, on the basis of histories of the degree of crowdedness and the moving direction stored in the storage unit 13. The wording "degree of influence" determined by the determination unit 18 means a degree at which people in each peripheral area have influence on the degree of crowdedness in the central area due to the movement of the people. For example, the determination unit 18 calculates a correlation coefficient between the degree of crowdedness in each peripheral area and the degree of crowdedness in the central area using only the degree of crowdedness stored together with the moving direction indicating a direction toward the central area, in the history of the degree of crowdedness in the peripheral area. The determination unit 18 determines the degree of influence of each peripheral area on the basis of the calculated correlation coefficient. The determination unit 18 can use the correlation coefficient as the degree of influence as it is. The degree of influence may be indicated by two values of the presence of influence and the absence of influence, or may be indicated by three values. A method of calculating the degree of influence is not limited.

According to the example of FIG. 12, since moving directions of a large number of people who are present in the peripheral area AR3 are toward the central area AR1, the degree of influence of the peripheral area AR3 is determined to be lower than those of the peripheral areas AR2 and AR4.

The determination unit 18 sequentially updates the degrees of influence of the respective peripheral areas with respect to the central areas. In addition, the determination unit 18 may update the degrees of influence with a predetermined frequency, or may determine the degrees of influence only once and then may not perform updating.

The information acquisition unit 14 acquires a plurality of different pieces of guidance information on the basis of the degrees of influence of the respective peripheral areas which are determined by the determination unit 18. The information acquisition unit 14 generates guidance information for suppressing the increase in the number of people moving from the peripheral area with a high degree of influence to the central area, for the peripheral area with a high degree of influence. For example, in a case where the information acquisition unit 14 detects the central area the degree of crowdedness of which exceeds a predetermined threshold value, the information acquisition unit generates guidance information for preventing people from moving toward the central area with respect to the peripheral area with a high degree of influence and a high degree of crowdedness, among peripheral areas of the central area. In this case, the information acquisition unit 14 may generate guidance information for guiding to another area other than the central area.

In addition, in a case where the predicted degree of crowdedness described in the second exemplary embodiment is used as guidance information, the information acquisition unit 14 may generate the predicted degree of crowdedness increased in accordance with the level of the degree of influence, as guidance information of each peripheral area. The information acquisition unit 14 can also generate guidance information including a display frequency corresponding to the degree of influence of each peripheral area. For example, the information acquisition unit 14 generates guidance information including a high display frequency with respect to the peripheral area with a high degree of influence.

The control unit 15 displays guidance information of the peripheral area on the display device 6 including the peripheral area in a display space. In a case where the display frequency is included in guidance information, the control unit 15 displays the guidance information on the display device 6 at the display frequency.

Example of Operation/Guidance Method

Figure 14:
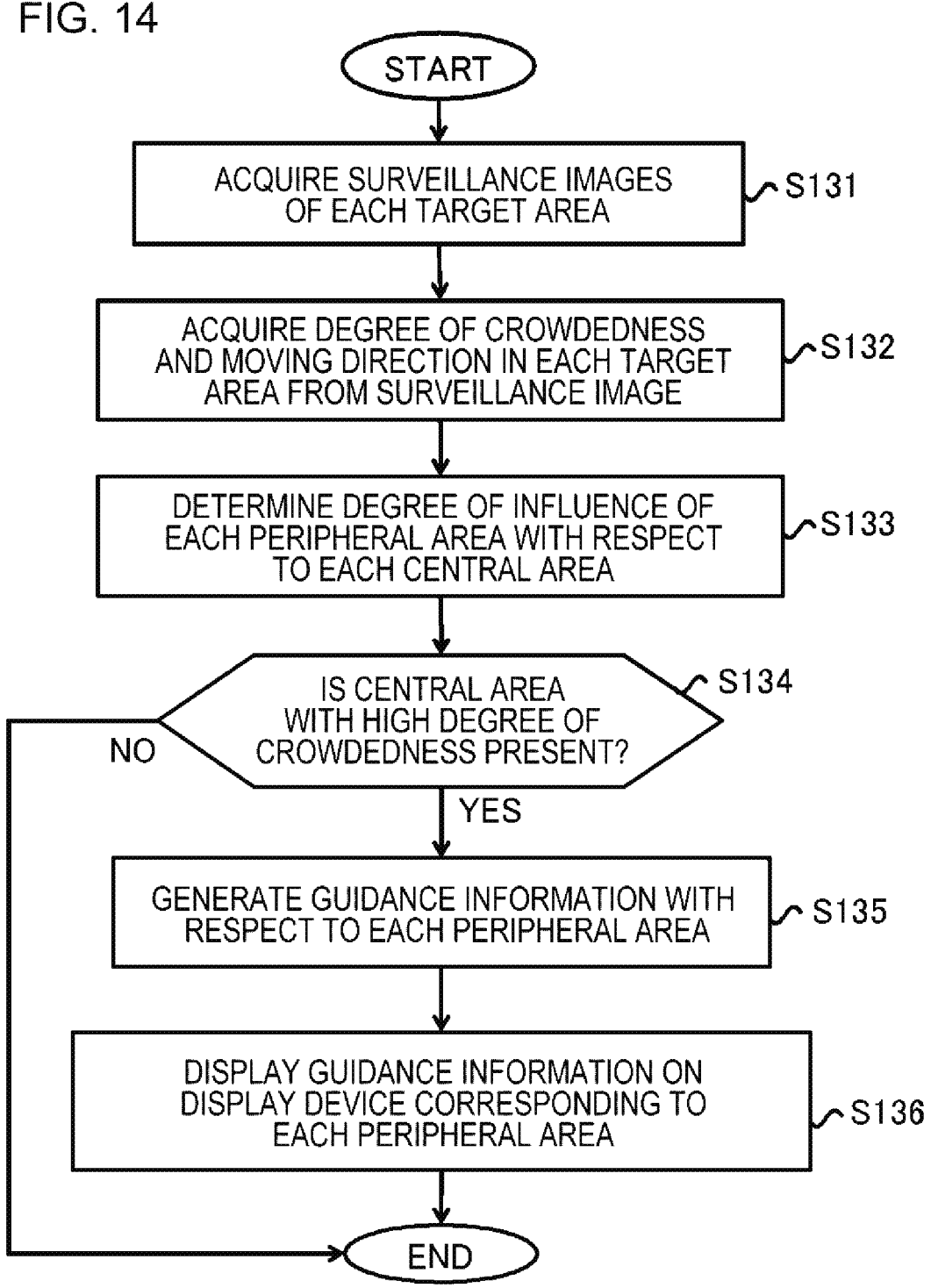
FIG. 14 is a flow chart showing an example of operation of the guidance processing apparatus according to the third exemplary embodiment.

Hereinafter, the guidance method according to the third exemplary embodiment will be described with reference to FIG. 14. FIG. 14 is a flow chart showing an example of operation of the guidance processing apparatus 10 according to the third exemplary embodiment. A subject of executing the guidance method according to the third exemplary embodiment is the same as that in the first exemplary embodiment. Steps are the same as contents of processing of the above-described processing units included in the guidance processing apparatus 10, and thus details of the steps will appropriately not be repeated here.

The guidance processing apparatus 10 previously stores information regarding the monitored place handled as the central area and the monitored place (target area) handled as the peripheral area with respect to each central area, as described above.

The guidance processing apparatus 10 acquires surveillance images captured by the surveillance cameras 5 (S131).

The guidance processing apparatus 10 analyzes the surveillance images acquired in (S131) to thereby acquire the degree of crowdedness and the moving direction in each target area (S132). A method of analyzing the surveillance images and methods of acquiring the degree of crowdedness and the moving direction as the state of the crowd are as described in the first exemplary embodiment.

The guidance processing apparatus 10 determines the degree of influence of each peripheral area with respect to each central area on the basis of the history of the degree of crowdedness in the central area and the histories of the degree of crowdedness and the moving direction of the peripheral area acquired in (S132) (S133).

The guidance processing apparatus 10 determines whether or not there exists the central area with a high degree of crowdedness, on the basis of the degree of crowdedness in the target area handled as each central area acquired in (S132) (S134). For example, the guidance processing apparatus 10 determines whether or not there exists the target area indicating the degree of crowdedness higher than the predetermined threshold value among the target areas handled as the central areas.

In a case where the central area with a high degree of crowdedness exists (S134; YES), the guidance processing apparatus 10 generates guidance information with respect to peripheral areas of the central area (S135). The guidance processing apparatus 10 generates guidance information for preventing people from moving from the peripheral areas to the central area. At this time, the guidance processing apparatus 10 may generate guidance information for only the peripheral area with a high degree of crowdedness. In addition, the guidance processing apparatus 10 can also generate different pieces of guidance information with respect to the peripheral areas on the basis of the degrees of crowdedness and the degrees of influence of the peripheral areas. In this case, the guidance processing apparatus 10 may generate guidance information with a stronger guiding force for the peripheral area with a higher degree of crowdedness and a higher degree of influence. The guidance processing apparatus 10 may include the display frequency of guidance information in the guidance information.

The guidance processing apparatus 10 displays the guidance information generated with respect to each peripheral area on the display device 6 including the peripheral area in the display space (S136). In a case where the display frequency is included in the guidance information, the guidance processing apparatus 10 displays the guidance information on the display device 6 at the display frequency.

In FIG. 14, a plurality of steps (processes) are shown in order, but steps performed in the third exemplary embodiment and the order of execution of the steps are not limited to only those in the example of FIG. 14. Step (S133) may be performed at any timing using the histories of the degree of crowdedness and the moving direction which are stored in the storage unit 13, as a separate step from FIG. 14.

Advantageous Effects According to Third Exemplary Embodiment

As described above, in the third exemplary embodiment, the degree of influence of each monitored place handled as the peripheral area with respect to each monitored place handled as the central area is determined on the basis of the degree of crowdedness and the moving direction of each monitored place which are obtained by analyzing the surveillance images. Guidance information for each peripheral area is generated on the basis of the degree of influence with respect to the central area which is determined with respect to each peripheral area, and each of the display devices 6 including each peripheral area in the display space displays the guidance information.

In this manner, in the third exemplary embodiment, guidance information presented to a certain area having influence on the degree of crowdedness in another area is generated in accordance with the level of the degree of influence of the certain area. According to the third exemplary embodiment, it is possible to efficiently suppress the increase in the degree of crowdedness in a certain area on the basis of guidance information presented to another area and to efficiently guide the crowd.

Fourth Exemplary Embodiment

Hereinafter, the guidance system and the guidance method according to the fourth exemplary embodiment will be described with reference to a plurality of drawings. Hereinafter, the fourth exemplary embodiment will be described focusing on contents different from those described above, and the same contents as those described above will appropriately not be repeated. The following contents may be added to the contents described above or may be replaced with the contents described above.

Processing Configuration

Figure 15:
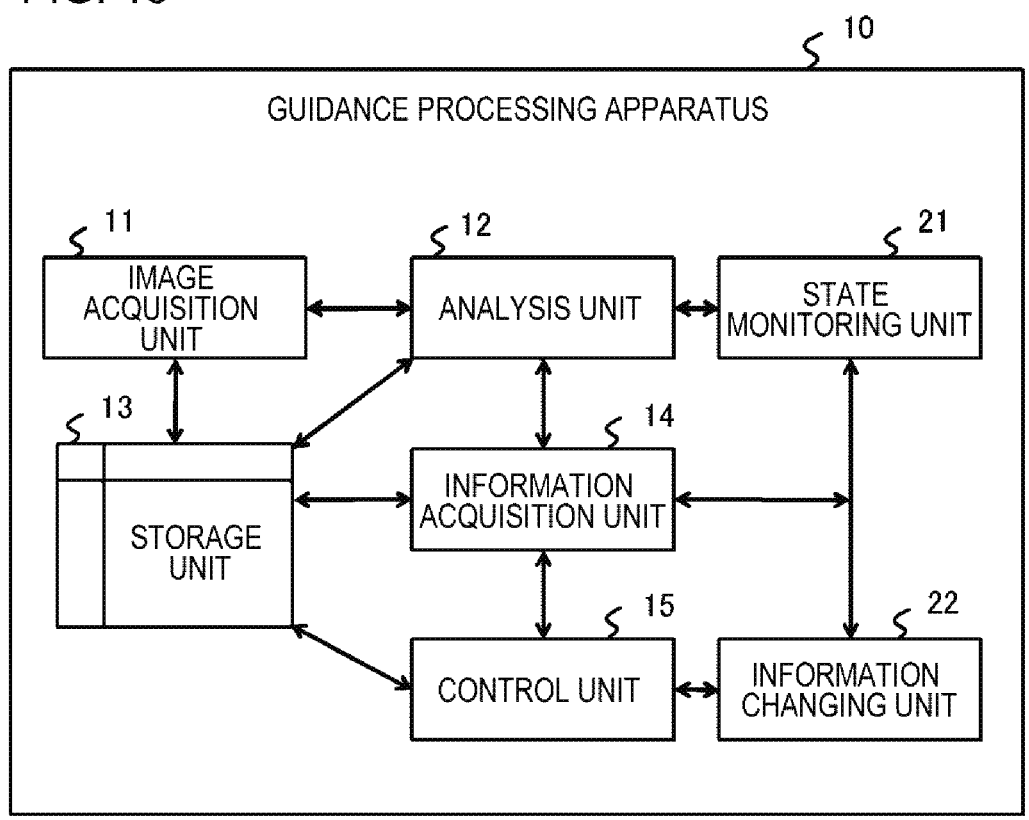
FIG. 15 is a schematic diagram showing an example of a processing configuration of a guidance processing apparatus according to a fourth exemplary embodiment.

FIG. 15 is a schematic diagram showing an example of a processing configuration of the guidance processing apparatus 10 according to the fourth exemplary embodiment. As shown in FIG. 15, the guidance processing apparatus 10 further includes a state monitoring unit 21 and an information changing unit 22 in addition to the configuration of the first exemplary embodiment. The state monitoring unit 21 and the information changing unit 22 are realized in the same manner as other processing units. FIG. 15 shows a configuration in which the state monitoring unit 21 and the information changing unit 22 are added to the processing configuration in the first exemplary embodiment, but the units may be added to the processing configuration in the second exemplary embodiment or the third exemplary embodiment.

The state monitoring unit 21 acquires a change condition of the state of the crowd based on time-series surveillance images captured after guidance information is displayed on each display device 6. Specifically, the state monitoring unit 21 acquires a history of the state of the crowd extracted by the analysis unit 12 from the time-series surveillance images after the display of guidance information, and acquires a change condition of the state of the crowd on the basis of the history. The history of the state of the crowd can also be acquired from the storage unit 13. The state monitoring unit 21 may acquire the change condition in which change and non-change are indicated by two values, and may acquire the change condition in which the degree of change is indicated by a numerical value. For example, the state monitoring unit 21 acquires information indicating increase, decrease, and non-change in the degree of crowdedness as the change condition.

The state monitoring unit 21 may acquire the change condition of the state of the crowd with respect to only the monitored place (target area) in which the state of the crowd is influenced by the presentation of guidance information. Thereby, since the monitored place for which the change condition has to be acquired is limited, it is possible to reduce a processing load. Hereinafter, the monitored place (target area) in which the state of the crowd is influenced by the presentation of guidance information will be referred to as control target area. The goal area in the second exemplary embodiment and the central area in the third exemplary embodiment are equivalent to control target areas.

The information changing unit 22 changes at least a piece of guidance information acquired by the information acquisition unit 14, on the basis of the change condition acquired by the state monitoring unit 21. Change modes of guidance information may include a change in the guidance destination, the stop of guidance, the increase or the decrease in a guiding force, and the like. For example, in a case where the state of the crowd does not change into a desired state after providing the guidance information in the control target area, the information changing unit 22 changes the guidance information into guidance information with a stronger guiding force. On the contrary, in a case where the state of the crowd approaches to a desired state by providing guidance information, the information changing unit 22 may change the guidance information into guidance information with a weaker guiding force. The increase or the decrease in the guiding force of guidance information can be realized by, for example, the increase or the decrease in the predicted degree of crowdedness, the display frequency of the guidance information, and the like.

The control unit 15 displays at least one guidance information changed by the information changing unit 22 on the display device 6 corresponding to the guidance information.

Example of Operation/Guidance Method

Figure 16:
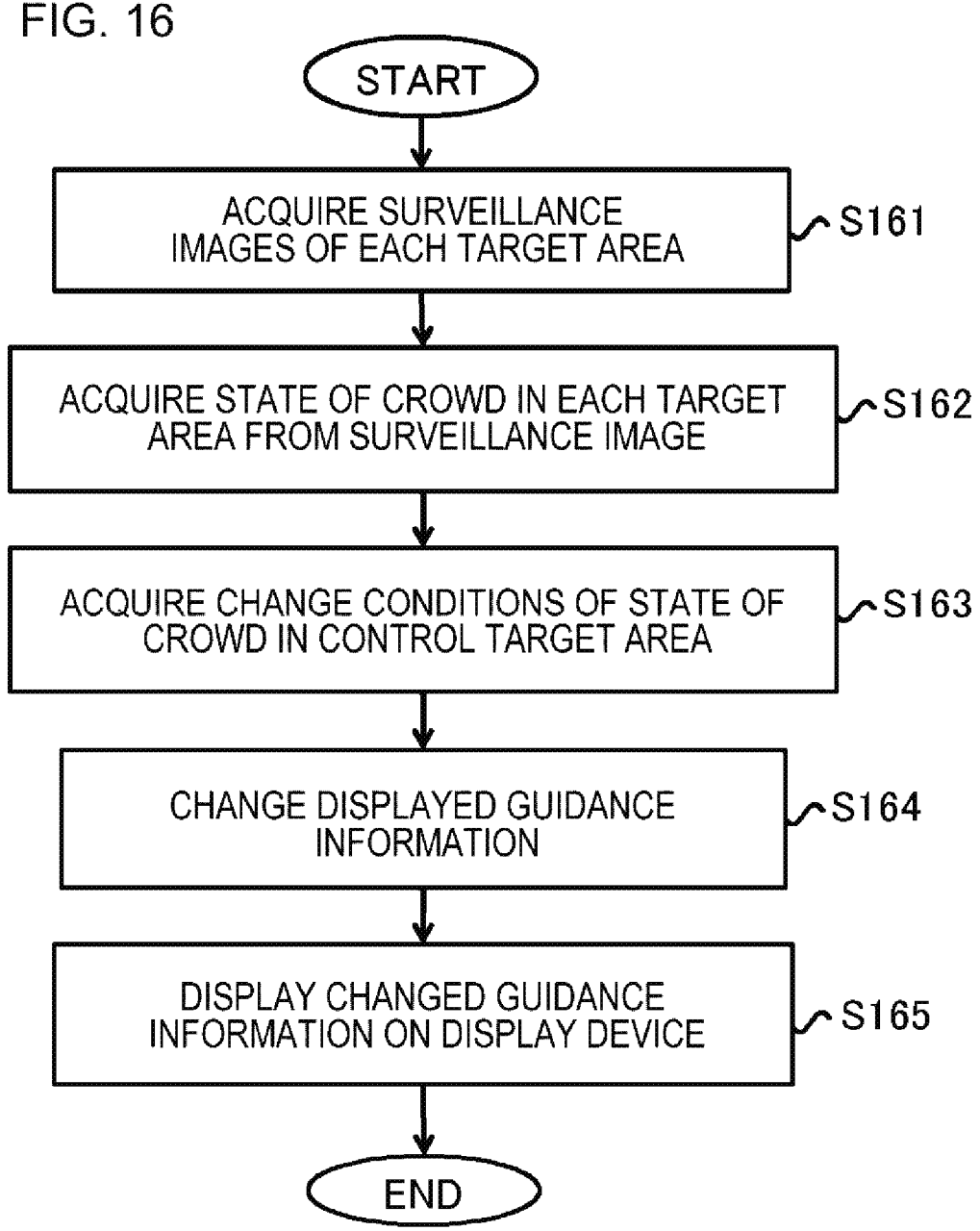
FIG. 16 is a flow chart showing an example of operation related to a change in guidance information of the guidance processing apparatus according to the fourth exemplary embodiment.

Hereinafter, the guidance method according to the fourth exemplary embodiment will be described with reference to FIG. 16. FIG. 16 is a flow chart showing an example of operation of the guidance processing apparatus 10 according to the fourth exemplary embodiment which is related to a change in guidance information. A subject of executing the guidance method according to the fourth exemplary embodiment is the same as that in the first exemplary embodiment. Steps are the same as contents of processing of the above-described processing units included in the guidance processing apparatus 10, and thus details of the steps will appropriately not be repeated here.

During the operation shown in FIG. 16, the guidance processing apparatus 10 displays guidance information on at least one display device 6. The state of the crowd in the control target area is influenced by the presentation of the guidance information.

The guidance processing apparatus 10 acquires surveillance images captured by respective surveillance cameras 5 (S161). The guidance processing apparatus 10 sequentially acquires the surveillance images in time series. The acquired surveillance images include surveillance images obtained by capturing the control target area.

The guidance processing apparatus 10 analyzes the surveillance images acquired in (S161) to thereby acquire the state of the crowd in the target area (S162). The guidance processing apparatus 10 may acquire only the state of the crowd in the control target area.

The guidance processing apparatus 10 acquires change conditions of the state of the crowd in the control target area (S163).

The guidance processing apparatus 10 changes displayed guidance information on the basis of the change condition acquired in (S163) (S164). The change mode of the guidance information is as described above.

The guidance processing apparatus 10 displays the changed guidance information on the corresponding display device 6 (S165).

Advantageous Effects According to Fourth Exemplary Embodiment

In the fourth exemplary embodiment, the change condition of the state of the crowd in the control target area is acquired on the basis of time-series surveillance images after the display of guidance information, and guidance information is changed in accordance with the change condition. In this manner, according to the fourth exemplary embodiment, results of the guidance of the crowd by providing guidance information are determined on the basis of the change condition of the state of the crowd of the control target area, and the guidance information is appropriately adjusted so that the state of the crowd changes to the desired state. Therefore, it is possible to efficiently guide the crowd so that the state of the crowd changes to the desired state.

MODIFICATION EXAMPLE

In the above-described embodiments, the guidance processing apparatus 10 (information acquisition unit 14) may acquire guidance information further using environment condition information indicating conditions of an environment.

Figure 17:
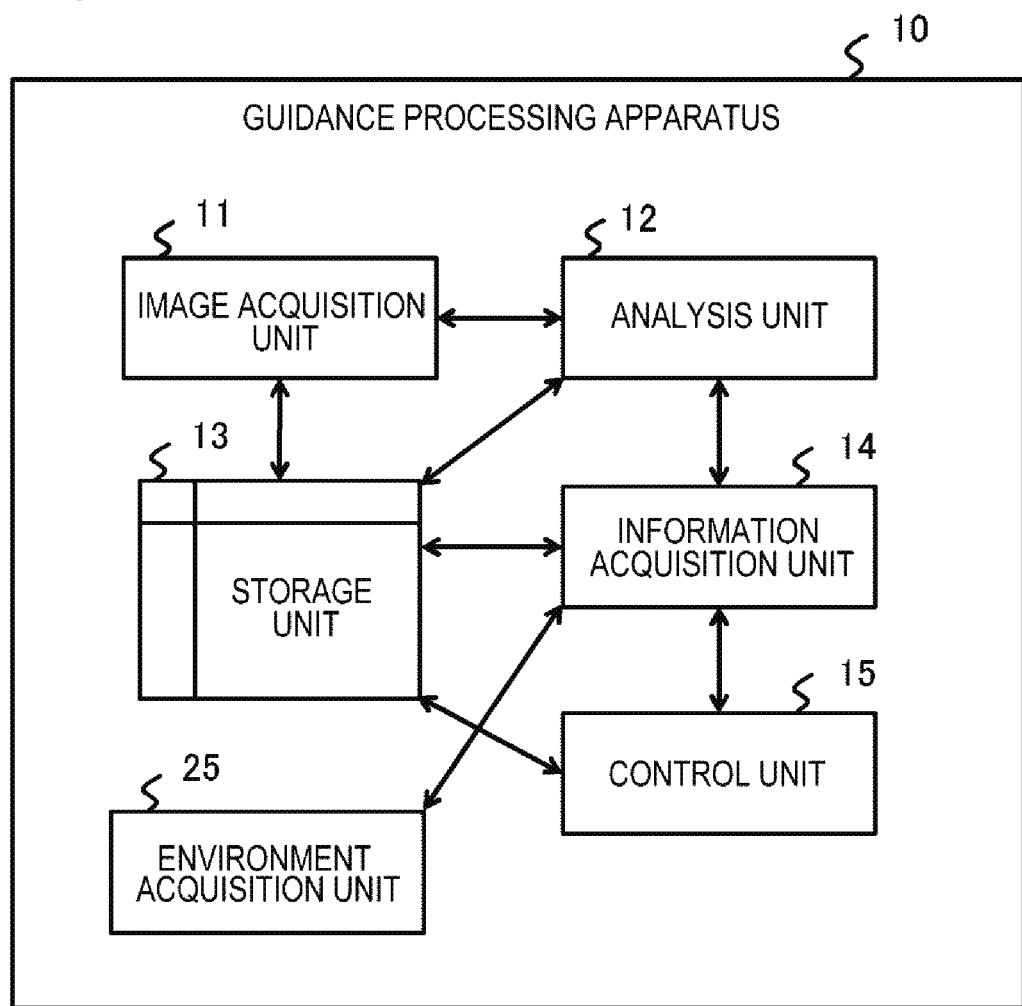
FIG. 17 is a schematic diagram showing an example of a processing configuration of a guidance processing apparatus according to a modification example.

FIG. 17 is a schematic diagram showing an example of a processing configuration of the guidance processing apparatus 10 according to the modification example. As shown in FIG. 17, the guidance processing apparatus 10 further includes an environment acquisition unit 25 in addition to the configuration of the first exemplary embodiment. The environment acquisition unit 25 is realized in the same manner as other processing units. FIG. 17 shows a configuration in which the environment acquisition unit 25 is added to the processing configuration in the first exemplary embodiment.

The environment acquisition unit 25 acquires environment condition information. The environment condition information may include weather condition information (weather, warning, and the like) and weather condition element information (temperature, humidity, and the like), abnormality information (delay of a train, accident, failure, natural disaster, and the like), and the like of, for example, a place in which there exists an object to be guided or a guidance destination. In addition, in a case where the crowd to be guided exists in an event hall, the environment condition information includes win or loss at the event, the contents of the event, and the like. The environment acquisition unit 25 acquires such environment condition information from another system or service through communication.

The information acquisition unit 14 acquires guidance information further using environment condition information acquired by the environment acquisition unit 25. According to Example 1, the information acquisition unit 14 may determine the ticket vending machine to be provided as guidance destination, using failure information of the ticket vending machines in addition to the degree of crowdedness and proximity of the ticket vending machines. According to Example 2, the information acquisition unit 14 may generate guidance information by distinguishing the seat sections for the winning team and the seat sections for the losing team from each other so that crowds in both the seat sections are not guided to the same guidance destination. In addition, in Example 4, guidance information may be generated so that the ticket gate connected to the passage that does not get wet by rain is preferentially handled as the guidance destination on a rainy day.

According to the modification example, it is possible to provide guidance information suitable for the desire of the crowd, thereby making it easier for the crowd to follow the guidance information. As a result, it is possible to appropriately guide the crowd.

Fifth Exemplary Embodiment

Hereinafter, the guidance processing apparatus and the guidance method according to the fifth exemplary embodiment will be described with reference to FIGS. 18 and 19.

Figure 18:
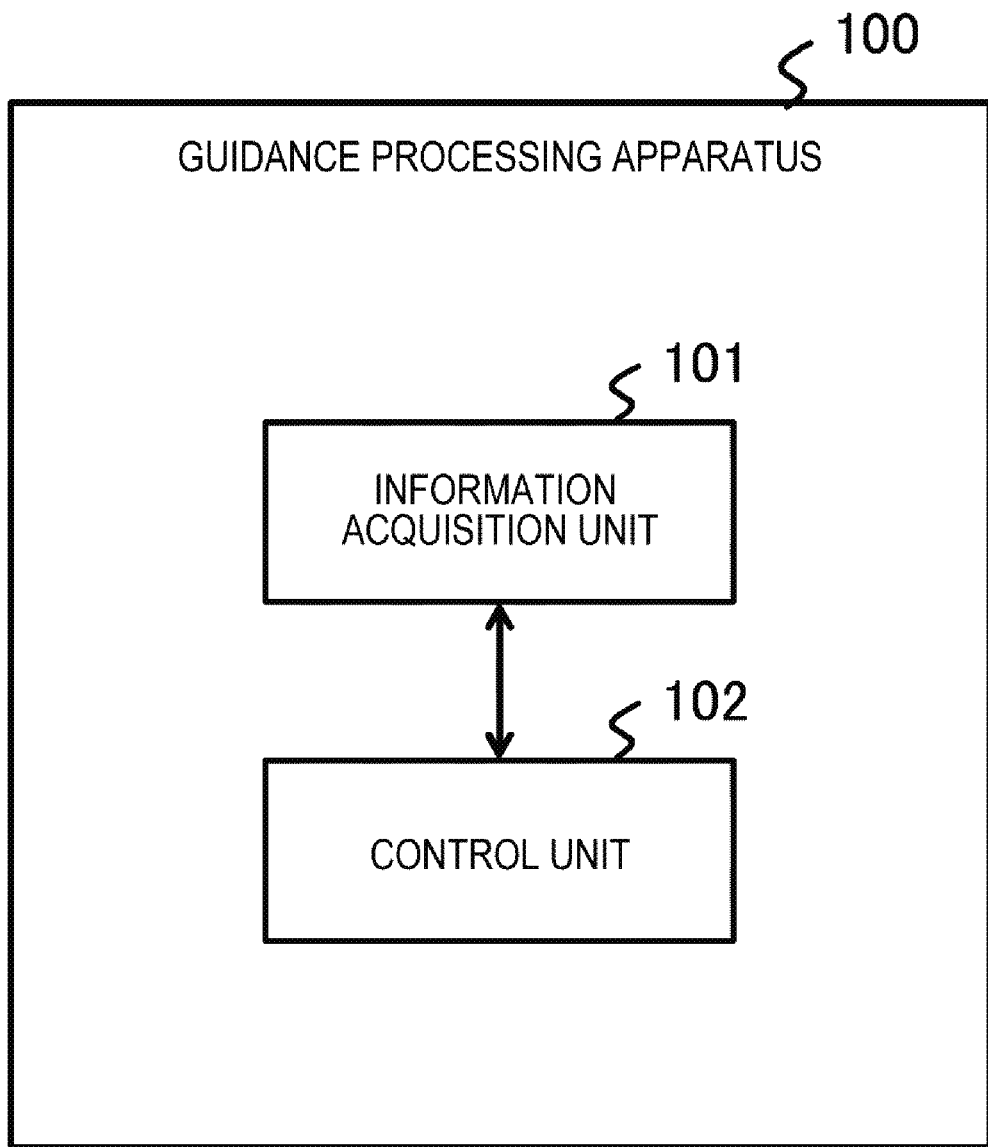
FIG. 18 is a schematic diagram showing an example of a processing configuration of a guidance processing apparatus according to a fifth exemplary embodiment.

FIG. 18 is a schematic diagram showing an example of a processing configuration of the guidance processing apparatus according to the fifth exemplary embodiment. As shown in FIG. 18, a guidance processing apparatus 100 includes an information acquisition unit 101 and a control unit 102. The guidance processing apparatus 100 shown in FIG. 18 has the same hardware configuration as that of, for example, the above-described guidance processing apparatus 10 shown in FIG. 1. However, the guidance processing apparatus 100 may not be connected to surveillance cameras 5 and display devices 6 so as to be capable of directly making an exchange with each other. A program is processed in the same manner as that of the guidance processing apparatus 10 described above, thereby realizing processing units.

The information acquisition unit 101 acquires a plurality of different pieces of guidance information on the basis of the states of a plurality of people within one or more images. The information acquisition unit 101 can extract the states of a plurality of people (crowd) from images by itself like the image acquisition unit 11 and the analysis unit 12 described above. In addition, the information acquisition unit 101 can also acquire information regarding the states of the plurality of people extracted by another computer from the another computer through communication. The wording "states of the plurality of people" is the same meaning as the state of the crowd described in the first exemplary embodiment. In addition, the information acquisition unit 101 uses the states of the plurality of people extracted from the image captured by one surveillance camera 5 or the plurality of images captured by a plurality of surveillance cameras 5. In the former case, guidance information is acquired on the basis of the state of people present in one monitored place. In the latter case, guidance information is acquired on the basis of the state of people present in a plurality of monitored places.

The information acquisition unit 101 acquires guidance information by the same method as those in the above-described exemplary embodiments. The information acquisition unit 101 can also select pieces of guidance information for target devices on the basis of the states of the plurality of people among a plurality of pieces of guidance information held in advance. For example, the information acquisition unit 101 holds guidance information indicating a first guidance destination and guidance information indicating a second guidance destination in advance for a first target device, and holds guidance information indicating a third guidance destination and guidance information indicating a fourth guidance destination in advance for a second target device. In a case where the states of the plurality of people indicates a high degree of crowdedness, the information acquisition unit 101 acquires guidance information indicating the second guidance destination for the first target device and acquire guidance information indicating the fourth guidance destination for the second target device. On the contrary, in a case where the states of the plurality of people indicates a low degree of crowdedness, the information acquisition unit 101 acquires guidance information indicating the first guidance destination for the first target device and acquires guidance information indicating the third guidance destination for the second target device.

The wording "guidance information" acquired by the information acquisition unit 101 means not only information to be displayed but also any information for guiding people. Specific contents of guidance information may vary depending on the target device to be controlled. An example of guidance information will be described below.

The control unit 102 performs the control of a plurality of target devices present in different spaces or the time division control of a target device so as to set a plurality of different states corresponding to a plurality of pieces of guidance information. The target device controlled by the control unit 102 is equivalent to various devices capable of guiding people. In addition to the display devices 6 (a user's portable terminal is included) in the above-described exemplary embodiments, a speaker, an illuminator, an air conditioner, an aroma generator, a passage control device that controls the width of a passage, and the like are also equivalent to target devices. Also in the above-described exemplary embodiments, such a target device may be controlled by the guidance processing apparatus 10 instead of the display device 6 or together with the display device 6. The control of the plurality of target devices and the time division control of the target device may be directly performed by the control unit 102, or may be indirectly performed by the control unit 102 through another device.

In a case where the target device is the display device 6, the control unit 102 controls the target devices (display devices 6) so as to become a state in which pieces of guidance information are displayed, similar to the above-described exemplary embodiments. The control of the display device 6 is realized by the transmission of drawing data or guidance information to the display device 6. The guidance information may include the designation of display modes such as a display frequency, a display size, and a display color. In a case where such designation is included in the guidance information, the control unit 102 controls the target devices so that the guidance information is displayed in the display mode designated by the guidance information.

In a case where the target device is a speaker, the control unit 102 controls target devices (speakers) so as to become a state where voices or sounds corresponding to pieces of guidance information are output. The control unit 102 can acquire pieces of voice data or pieces of sound data corresponding to pieces of guidance information and can transmit the acquired pieces of voice data or pieces of sound data to the respective target devices, thereby realizing the control of the target devices. In this case, guidance information acquired by the information acquisition unit 101 is equivalent to voice identification information for identifying voice data or sound data, or is equivalent to the voice data or the sound data itself. In a case where sounds are output from the speakers, speakers installed at a guidance destination and a passage to the guidance destination output relaxing music, and speakers installed at passages in the other places output noise, thereby allowing the crowd to be guided in the direction of the guidance destination. In addition, in a case where the crowd is desired to stay in a certain place (a flow rate to the destination is desired to be decreased) in order to alleviate crowdedness conditions, the control unit 102 may play music for promoting the crowd to stay at a midway passage which attracts the crowd.

In a case where the target device is an illuminator, the control unit 102 controls target devices (speakers) so as to satisfy at least one of the color and brightness corresponding to pieces of guidance information. In this case, guidance information acquired by the information acquisition unit 101 is equivalent to illuminator instruction information (illuminator instruction signal) for designating at least one of the color and brightness of the illuminator. Illuminators installed at a guidance destination and a passage to the guidance destination are set to be bright, and illuminators installed at passages in the other places are set to be dark, thereby allowing the crowd to be guided in the direction of the guidance destination. In addition, in a case where the crowd is desired to stay in a certain place in order to alleviate crowdedness conditions, the control unit 102 may brighten only the portion.

In a case where the target device is an air conditioner (an air blower, a mist generator, a stove, an electric heater, and the like are also included), the control unit 102 controls target devices (air conditioners) so as to satisfy at least one of temperature, humidity, the strength of wind, and the direction of wind corresponding to pieces of guidance information. In this case, guidance information acquired by the information acquisition unit 101 is equivalent to air conditioning instruction information (air conditioning instruction signal) for designating temperature, humidity, the strength of wind, the direction of wind, and the like. On a hot summer day, air conditioners installed at a guidance destination and a passage of the guidance destination are set to a low temperature and a low humidity, and air conditioners installed at passages in the other places are stopped, thereby allowing the crowd to be guided in the direction of the guidance destination. In a case where the crowd is desired to stay in a certain place in order to alleviate crowdedness conditions, the control unit 102 may operate an air conditioning in that place to increase comfortability.

In a case where the target device is an aroma generator, the control unit 102 controls target devices (aroma generators) so as to become a state where an aroma corresponding to guidance information is generated. In this case, guidance information acquired by the information acquisition unit 101 is equivalent to aroma instruction information (aroma instruction signal) for designating an aroma to be generated. Aroma generators installed at a guidance destination and a passage to the guidance destination generate an aroma that people like, and aroma generators installed at passages in the other places generate an aroma that people dislike, thereby allowing the crowd to be guided in the direction of the guidance destination. In a case where the crowd is desired to stay in a certain place in order to alleviate crowdedness conditions, the control unit 102 may generate an aroma attracting the crowd at that place.

In a case where the target device is a passage control device, the control unit 102 controls target devices (passage control devices) so that a passage controlled by the passage control device has a width corresponding to guidance information. In this case, guidance information acquired by the information acquisition unit 101 is equivalent to passage width instruction information (passage width instruction signal) for designating the width of a passage. The width of a guidance destination and the width of a passage of the guidance destination are set to be wide or a normal width by the passage control devices, and the widths of passages in the other places are set to be narrow, thereby allowing the crowd to be guided in a direction of the guidance destination. In addition, in a case of a passage control device, such as a pole or a partition, which is capable of adjusting the length of a passage instead of the width, the control unit 102 may change the length of the passage.

The time division control of the target devices performed by the control unit 102 means that the states of the target devices are switched to different states corresponding to a plurality of pieces of guidance information with time. For example, in a case where the pieces of guidance information are expressed or uttered in different languages, the control unit 102 sequentially outputs the pieces of guidance information to the display device 6 or a speaker in a changeover manner. For example, in a case where the crowd having a plurality of nationalities is guided, the information acquisition unit 101 acquires pieces of guidance information differing in a guidance method for each language. The control unit 102 controls speakers so that voices uttered in languages corresponding to the pieces of guidance information are output in time series. Specifically, a voice announcement for guidance to an exit A is output in Chinese, a voice announcement for guidance to an exit B is output in Korean, and then a voice announcement for guidance to an exit C is output in Japanese. Thereby, it is possible to guide the crowd for each nationality. In this case, the information acquisition unit 101 may acquire guidance information corresponding to the state of people (the number of people and the like) for each nationality as the state of a plurality of people. Thereby, it is possible to perform guidance control of first guiding the crowd having the nationality for which the number of people is small and then guiding the crowd having the nationality for which the number of people is large.

Figure 19:
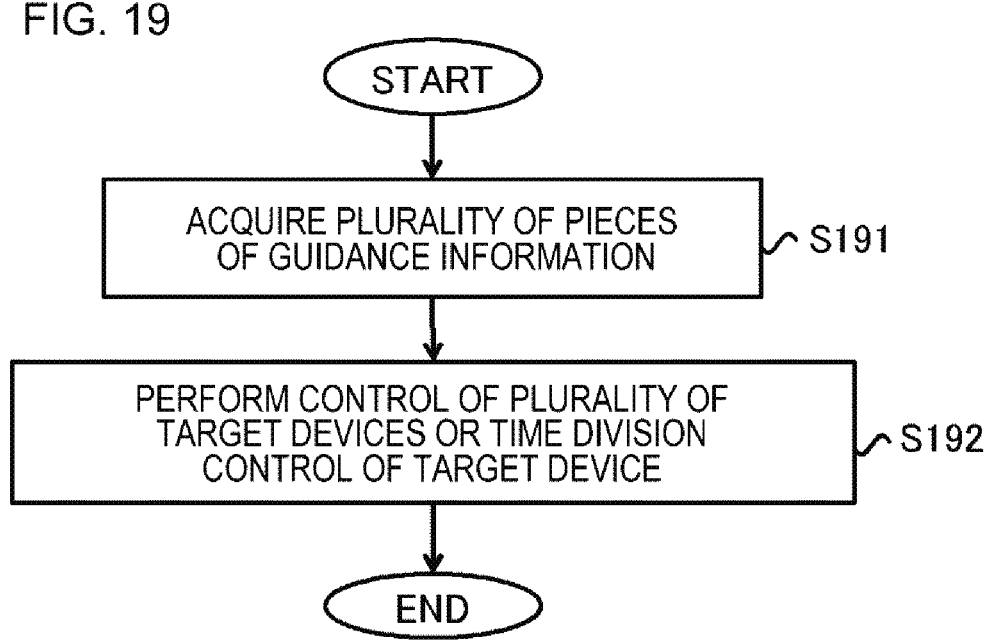
FIG. 19 is a flow chart showing an example of operation of the guidance processing apparatus according to the fifth exemplary embodiment.

FIG. 19 is a flow chart showing an example of operation of the guidance processing apparatus 100 according to the fifth exemplary embodiment. As shown in FIG. 19, the guidance method according to the fifth exemplary embodiment is performed by at least one computer such as the guidance processing apparatus 100. For example, steps shown in the drawing are performed by processing units included in the guidance processing apparatus 100.

The guidance method according to the fifth exemplary embodiment includes acquiring a plurality of different pieces of guidance information on the basis of the states of a plurality of people within one or more images (S191), performing control of a plurality of target devices present in different spaces or the time division control of a target device so as to set a plurality of different states corresponding to the plurality of pieces of guidance information (S192). Step (S191) is equivalent to (S54) of FIG. 5, (S116) of FIG. 11, (S135) of FIG. 14, and the like. Step (S192) is equivalent to (S55) of FIG. 5, (S117) of FIG. 11, (S136) of FIG. 17, and the like.

According to the fifth exemplary embodiment, it is possible to obtain the same operational effects as those in the above-described exemplary embodiments.

Note that, in a plurality of flowcharts used in the above description, a plurality of steps (processes) are described in order, but the order of execution of steps performed in the exemplary embodiments is not limited to the order in the description. In the exemplary embodiments, the order of steps shown in the drawings can be changed without a disadvantage in terms of content. In addition, the above-described exemplary embodiments and modification examples can be combined with each other in a range in which the contents thereof are not contrary to each other.

Some or all of the above-described exemplary embodiments and modification examples can be specified as follows. However, the above-described exemplary embodiments and modification examples are not limited to the following description.

1. A guidance processing apparatus including:

an information acquisition unit acquiring a plurality of different pieces of guidance information on the basis of states of a plurality of people within one or more images; and a control unit performing control of a plurality of target devices present in different spaces or time division control of a target device so as to set a plurality of different states corresponding to the plurality of pieces of guidance information.

2. The guidance processing apparatus according to 1, further including:

a state monitoring unit acquiring change conditions of states of a plurality of people based on time-series images captured after the control of the plurality of target devices or the time division control of the target device is performed; and an information changing unit changing at least one of the plurality of pieces of guidance information on the basis of the change conditions, wherein the control unit changes the control of the target device corresponding to the changed at least one piece of guidance information.

3. The guidance processing apparatus according to 1 or 2, further including:

an environment acquisition unit acquiring environment condition information indicating conditions of an environment, wherein the information acquisition unit acquires a plurality of pieces of guidance information further using the environment condition information.

4. The guidance processing apparatus according to any one of 1 to 3, further including:

an analysis unit analyzing a plurality of images obtained by capturing different target areas to thereby acquire states of a plurality of people in each of the target areas, wherein the information acquisition unit generates pieces of guidance information corresponding to a positional relationship between the target areas, between the spaces corresponding to the plurality of target devices, or between each of the spaces and each of the target areas on the basis of the states of the plurality of people in each of the target areas, and wherein the control unit sets each of the plurality of target devices to be in a state corresponding to the pieces of guidance information.

5. The guidance processing apparatus according to any one of 1 to 4, further including:

an analysis unit analyzing an image obtained by capturing a first target area to thereby acquire a degree of crowdedness of people in the first target area, and analyzing an image obtained by capturing a second target area directed to the first target area to thereby acquire a flow rate of people in the second target area, wherein the information acquisition unit includes a prediction unit acquiring a predicted degree of crowdedness of people in the first target area at any point in time on the basis of the degree of crowdedness in the first target area and the flow rate in the second target area which are acquired by the analysis unit, and acquires a predicted degree of crowdedness in the first target area at a point in time when people present in each of the spaces reach the first target area in the future, as the guidance information with respect to each of the spaces, using a time required for people to move from each of the spaces corresponding to a plurality of output devices to the first target area and the predicted degree of crowdedness, and wherein the control unit outputs the predicted degree of crowdedness in the first target area, which is acquired with respect to each of the spaces corresponding to the plurality of output devices, to each of the output devices.

6. The guidance processing apparatus according to 5, wherein the plurality of output devices are a plurality of portable terminals, wherein the information acquisition unit acquires pieces of positional information and pieces of moving speed information regarding the plurality of portable terminals, estimates times required for users holding the respective portable terminals to reach the first target area using the pieces of positional information and the pieces of moving speed information, and acquires a the predicted degree of crowdedness in the first target area at a point in time when each of the users reaches the first target area in the future, with respect to each of the plurality of portable terminals, and wherein the control unit displays the predicted degree of crowdedness in the first target area on each of the plurality of portable terminals.

7. The guidance processing apparatus according to 5, wherein the information acquisition unit increases the predicted degree of crowdedness in the first target area which is acquired with respect to each of the spaces corresponding to the plurality of output devices on the basis of the flow rate in the second target area, and acquires the increased predicted degree of crowdedness as the guidance information.

8. The guidance processing apparatus according to any one of 1 to 7, further including:

an analysis unit analyzing an image obtained by capturing a target area to thereby acquire a degree of crowdedness of people in the target area, and analyzing a plurality of images obtained by capturing a plurality of peripheral areas of the target area to thereby acquire a degree of crowdedness and a moving direction of people in each of the peripheral areas, wherein the information acquisition unit includes a determination unit determining degrees of influence of the plurality of peripheral areas on the degree of crowdedness in the target area on the basis of the degrees of crowdedness and the moving directions in the plurality of peripheral areas, and acquires a plurality of different pieces of guidance information on the basis of the degrees of influence of the plurality of peripheral areas.

9. A guidance method performed by at least one computer, the guidance method including:

acquiring a plurality of different pieces of guidance information on the basis of states of a plurality of people within one or more images; and performing control of a plurality of target devices present in different spaces or time division control of a target device so as to set a plurality of different states corresponding to the plurality of pieces of guidance information.

10. The guidance method according to 9, further including:

acquiring change conditions of states of a plurality of people based on time-series images captured after the control of the plurality of target devices or the time division control of the target device is performed;

changing at least one of the plurality of pieces of guidance information on the basis of the change conditions; and changing the control of the target device corresponding to the changed at least one piece of guidance information.

11. The guidance method according to 9 or 10, further including:

acquiring environment condition information indicating conditions of an environment, wherein the acquiring of the guidance information includes acquiring a plurality of pieces of guidance information further using the environment condition information.

12. The guidance method according to any one of 9 to 11, further including:

analyzing a plurality of images obtained by capturing different target areas to thereby acquire states of a plurality of people in each of the target areas, wherein the acquiring of the guidance information includes generating pieces of guidance information corresponding to a positional relationship between the target areas, between the spaces corresponding to the plurality of target devices, or between each of the spaces and each of the target areas on the basis of the states of the plurality of people in each of the target areas, and wherein the control of the target device includes setting each of the plurality of target devices to be in a state corresponding to the pieces of guidance information.

13. The guidance method according to any one of 9 to 12, further including:

analyzing an image obtained by capturing a first target area to thereby acquire a degree of crowdedness of people in the first target area, and analyzing an image obtained by capturing a second target area directed to the first target area to thereby acquire a flow rate of people in the second target area; and acquiring a predicted degree of crowdedness of people in the first target area at any point in time on the basis of the degree of crowdedness in the first target area and the flow rate in the second target area, wherein the acquiring of the guidance information includes acquiring a predicted degree of crowdedness in the first target area at a point in time when people present in each of the spaces reach the first target area in the future, as the guidance information with respect to each of the spaces, using a time required for people to move from each of the spaces corresponding to a plurality of output devices to the first target area and the predicted degree of crowdedness, and wherein the control of the target device includes outputting the predicted degree of crowdedness in the first target area, which is acquired with respect to each of the spaces corresponding to the plurality of output devices, to each of the output devices.

14. The guidance method according to 13, wherein the plurality of output devices are a plurality of portable terminals, wherein the guidance method further includes:

acquiring pieces of positional information and pieces of moving speed information regarding the plurality of portable terminals; and estimating times required for users holding the respective portable terminals to reach the first target area using the pieces of positional information and the pieces of moving speed information, wherein the acquiring of the guidance information includes acquiring a pieces of positional information and pieces of moving speed information of the first target area at a point in time when each of the users reaches the first target area in the future, with respect to each of the plurality of portable terminals, and wherein the control of the target device includes displaying the predicted degree of crowdedness in the first target area on each of the plurality of portable terminals.

15. The guidance method according to 13, wherein the acquiring of the guidance information includes increasing the predicted degree of crowdedness in the first target area which is acquired with respect to each of the spaces corresponding to the plurality of output devices on the basis of the flow rate in the second target area, and acquiring the increased predicted degree of crowdedness as the guidance information.

16. The guidance method according to any one of 9 to 15, further including:

analyzing an image obtained by capturing a target area to thereby acquire a degree of crowdedness of people in the target area, and analyzing a plurality of images obtained by capturing a plurality of peripheral areas of the target area to thereby acquire a degree of crowdedness and a moving direction of people in each of the peripheral areas; and determining degrees of influence of the plurality of peripheral areas on the degree of crowdedness in the target area on the basis of the degrees of crowdedness and the moving directions in the plurality of peripheral areas, wherein the acquiring of the guidance information includes acquiring a plurality of different pieces of guidance information on the basis of the degrees of influence of the plurality of peripheral areas.

17. A guidance processing apparatus including:

an information acquisition unit generating guidance information on the basis of crowdedness conditions of people in a plurality of images obtained by capturing a plurality of monitored places, the monitored places, and a plurality of places provided with target devices; and a control unit controlling the target devices in the plurality of places in accordance with the guidance information.

18. A guidance method performed by at least one computer, the guidance method including:

generating guidance information on the basis of crowdedness conditions of people in a plurality of images obtained by capturing a plurality of monitored places, the monitored places, and a plurality of places provided with target devices; and controlling the target devices in the plurality of places in accordance with the guidance information.

19. A program causing at least one computer to perform the guidance method according to any one of 9 to 16 and 18.

20. A computer-readable recording medium having the program according to 19 stored thereon.

The application is based on Japanese Patent Application No. 2014-134664 filed on Jun. 30, 2014, the content of which is incorporated herein by reference.

The invention claimed is:

1. A people guidance system comprising:
at least one memory storing instructions;
at least one processor executing the instructions to perform:

acquiring at least one of a number of people, density, or a degree of crowdedness of people in a first target area at a current time;

acquiring a movement of people in a second target area at the current time;

learning a correlation between at least one of the number of people, density, or the degree of crowdedness of people in the first target area and the movement of people in the second target area based on historical data;

estimating a time required for reaching from the second target area to the first target area;

predicting, based on the correlation, at least one of the number of people, the density, or the degree of crowdedness of people at a time after the estimated time from the current time in the first target area;

controlling, based on the prediction, at least one display device in the second target area to display information based on the at least one of the number of people, the density, or the degree of crowdedness of people at the time after the estimated time from the current time in the first target area;

analyzing a plurality of images obtained by capturing a plurality of peripheral areas of the first target area to thereby acquire a degree of crowdedness and a moving direction of people in each of the peripheral areas;

determining degrees of influence of the plurality of peripheral areas on the degree of crowdedness in the first target area based on the degrees of crowdedness and the moving directions in the plurality of peripheral areas and selecting at least one peripheral area with a high degree of influence on the degree of crowdedness in the first target area from among the plurality of peripheral areas based on the degrees of influence of the plurality of peripheral areas; and in response to determining that the degree of crowdedness in the first target area exceeds a threshold, displaying guidance information on a display device in the at least one peripheral area, the guidance information comprising information for guiding people in the at least one peripheral area to move toward an area other than the first target area.

2. The people guidance system according to claim 1, wherein the at least one processor performs:
acquiring the at least one of the number of people, the density, or the degree of crowdedness of people in the first target area by analyzing an image obtained by at least one surveillance camera installed at the first target area.

3. The people guidance system according to claim 1, wherein the at least one processor performs:
acquiring the at least one of the number of people, the density, or the degree of crowdedness of people in the first target area based on position information of portable terminals in the first target area.

4. The people guidance system according to claim 1, wherein the target area is located nearby a certain event hall, and the at least one processor performs:
causing the display device to present the information to alleviate the degree of crowdedness of people at one or more stations located nearby the event hall.

5. The people guidance system according to claim 1, wherein:
the at least one processor performs:
acquiring a degree of crowdedness of people present in the first target area by analyzing an image obtained by capturing the first target area;
acquiring a flow rate of people in the second target area by analyzing an image obtained by capturing the second target area;
predicting a degree of crowdedness of people in the first target area at any point in time on the basis of the degree of crowdedness present in the first target area and flow rate of people in the second target area; and
outputting the predicted degree of crowdedness in the first target area to a plurality of output devices, the plurality of output devices disposed to the second target area.

6. The people guidance system according to claim 5, wherein the plurality of output devices are a plurality of portable terminals, and
the at least one processor performs:
acquiring pieces of positional information and pieces of moving speed information regarding the plurality of portable terminals;
acquiring the predicted degree of crowdedness in the first target area at a point in time when each person reaches the first target area in the future, using the pieces of positional information and the pieces of moving speed information; and
displaying the predicted degree of crowdedness in the first target area on the plurality of portable terminals.

7. The people guidance system according to claim 5, wherein
the at least one processor performs:
changing the predicted degree of crowdedness in the first target area which is acquired with respect to each of spaces corresponding to the plurality of output devices on the basis of the flow rate of people in the second target area.

8. The people guidance system according to claim 1, wherein the at least one processor is further configured to perform causing the at least one display device to present the information regarding an on-sale store.

9. A guidance method performed by at least one computer, the guidance method comprising:
acquiring at least one of a number of people, density, or a degree of crowdedness of people in a first target area at a current time;
acquiring a movement of people in a second target area at the current time;
learning a correlation between at least one of the number of people, density, or the degree of crowdedness of people in the first target area and the movement of people in the second target area on historical data;
estimating a time required for reaching from the second target area to the first target area;
predicting, based on the correlation, at least one of the number of people, the density, or the degree of crowdedness of people at a time after the estimated time from the current time in the first target area;
controlling, based on the prediction, at least one display device in the second target area to display information based on the at least one of the number of people, the density, or the degree of crowdedness of people at the time after the estimated time from the current time in the first target area;
analyzing a plurality of images obtained by capturing a plurality of peripheral areas of the first target area to thereby acquire a degree of crowdedness and a moving direction of people in each of the peripheral areas;
determining degrees of influence of the plurality of peripheral areas on the degree of crowdedness in the first target area based on the degrees of crowdedness and the moving directions in the plurality of peripheral areas and selecting at least one peripheral area with a high degree of influence on the degree of crowdedness in the first target area from among the plurality of peripheral areas based on the degrees of influence of the plurality of peripheral areas; and
in response to determining that the degree of crowdedness in the first target area exceeds a threshold, displaying guidance information on a display device in the at least one peripheral area, the guidance information comprising information for guiding people in the at least one peripheral area to move toward an area other than the first target area.

10. The guidance method according to claim 9, wherein the guidance method comprises:
acquiring the at least one of the number of people, the density, or the degree of crowdedness of people in the first target area by analyzing an image obtained by at least one surveillance camera installed at the first target area.

11. The guidance method according to claim 9, wherein the guidance method comprises:
acquiring the at least one of the number of people, the density, or the degree of crowdedness of people in the first target area based on position information of portable terminals in the first target area.

12. The guidance method according to claim 9, wherein the target area is located nearby a certain event hall, and the guidance method comprises:
causing the display device to present the information to alleviate the degree of crowdedness of people at one or more stations located nearby the event hall.

13. The guidance method according to claim 9, wherein the guidance method comprises:
acquiring a degree of crowdedness of people present in the first target area by analyzing an image obtained by capturing the first target area;
acquiring a flow rate of people in the second target area by analyzing an image obtained by capturing the second target area;
predicting a degree of crowdedness of people in the first target area at any point in time on the basis of the degree of crowdedness present in the first target area and flow rate of people in the second target area; and
outputting the predicted degree of crowdedness in the first target area to a plurality of output devices, the plurality of output devices disposed to the second target area.

14. The guidance method according to claim 9, wherein the guidance method further comprises causing the at least one display device to present the information regarding an on-sale store.

15. A non-transitory computer-readable storage medium storing a program causing at least one computer to perform:
acquiring at least one of a number of people, density, or a degree of crowdedness of people in a first target area at a current time;
acquiring a movement of people in a second target area at the current time;
learning a correlation between at least one of the number of people, density, or the degree of crowdedness of people in the first target area and the movement of people in the second target area based on historical data;
estimating a time required for reaching from the second target area to the first target area;
predicting, based on the correlation, at least one of the number of people, the density, or the degree of crowdedness of people at a time after the estimated time from the current time in the first target area;
controlling, based on the prediction, at least one display device in the second area to display information based on the at least one of the number of people, the density, or the degree of crowdedness of people at the time after the estimated time from the current time in the first target area;
analyzing a plurality of images obtained by capturing a plurality of peripheral areas of the first target area to thereby acquire a degree of crowdedness and a moving direction of people in each of the peripheral areas:
determining degrees of influence of the plurality of peripheral areas on the degree of crowdedness in the first target area based on the degrees of crowdedness and the moving directions in the plurality of peripheral areas and selecting at least one peripheral area with a high degree of influence on the degree of crowdedness in the first target area from among the plurality of peripheral areas based on the degrees of influence of the plurality of peripheral areas; and
in response to determining that the degree of crowdedness in the first target area exceeds a threshold, displaying guidance information on a display device in the at least one peripheral area, the guidance information comprising information for guiding people in the at least one peripheral area to move toward an area other than the first target area.

16. The non-transitory computer-readable storage medium according to claim 15, wherein the program further causes the at least one computer to perform causing the at least one display device to present the information regarding an on-sale store.

* * * * *